United States Patent [19]

Buchelt

[11] Patent Number: 5,035,377

[45] Date of Patent: * Jul. 30, 1991

[54] FREE STANDING OR AIRCRAFT LIFT GENERATOR

[75] Inventor: Benno E. Buchelt, Maria Saal, Austria

[73] Assignee: Technolizenz Establishment, Triesen, Liechtenstein

[*] Notice: The portion of the term of this patent subsequent to Jan. 10, 2006 has been disclaimed.

[21] Appl. No.: 247,111

[22] Filed: Sep. 20, 1988

Related U.S. Application Data

[63] Continuation-in-part of Ser. No. 10,360, Feb. 3, 1987, Pat. No. 4,796,836, which is a continuation of Ser. No. 834,799, Feb. 28, 1986, abandoned.

[30] Foreign Application Priority Data

Feb. 28, 1985 [AT] Austria ................................ 600/85

[51] Int. Cl.⁵ ........................ B64C 27/02; B64C 29/02
[52] U.S. Cl. ................................ 244/12.1; 244/23 C; 416/223 R; 416/DIG. 2
[58] Field of Search ................ 244/12.1, 12.2, 23 A, 244/23 R, 236, 65; 416/DIG. 2, 5, 223 R, 223 A

[56] References Cited

U.S. PATENT DOCUMENTS

| | | |
|---|---|---|
| 2,953,320 | 9/1960 | Parry . |
| 2,990,137 | 6/1961 | Willis ................................ 244/12.2 |
| 3,054,578 | 9/1962 | Brocard ........................... 244/73 B |
| 3,116,898 | 1/1964 | Clark et al. ...................... 244/23 B |
| 4,795,111 | 1/1989 | Mollen ............................. 244/23 C |

FOREIGN PATENT DOCUMENTS 75976 7/1961 France .

OTHER PUBLICATIONS

Dommasch, *Elements of Propeller and Helicopter Aerodynamics*, 1953.
Short Way Derivation of the Computerized Formula Apparatus for the Radial Distribution of the Incidence Angle $\beta\infty$ of the Fan Blades of the Patented Lifting Fan, 14 pages Mar.-Jun. 1987 Illustrated 1989 Benno Buchelt.

*Primary Examiner*—Galen Barefoot
*Attorney, Agent, or Firm*—Herbert Dubno

[57] ABSTRACT

In order to increase the lift supporting underpressure force on top of the inlet fairing of a shrouded fan of a lifting engine and in order to reduce the negative lift generating force of the inlet momentum acting on the rotor area of the fan, a particular geometry of the inlet fairing contour in connection with a particular twist of the fan rotor blades (3) is applied. This results in large differences of static pressures between front side and rear side of the fan at outer radii and there will be more small pressure difference at inner radii. This causes an apparent small change of the blade angle $\beta$ along a mean radial range of the rotor blades. Guide vanes (25) which might follow downstream of the fan rotor blades in some design cases, will have an arrangement of radial twist distribution mirror symmetrical to that of the rotor blades.

20 Claims, 24 Drawing Sheets

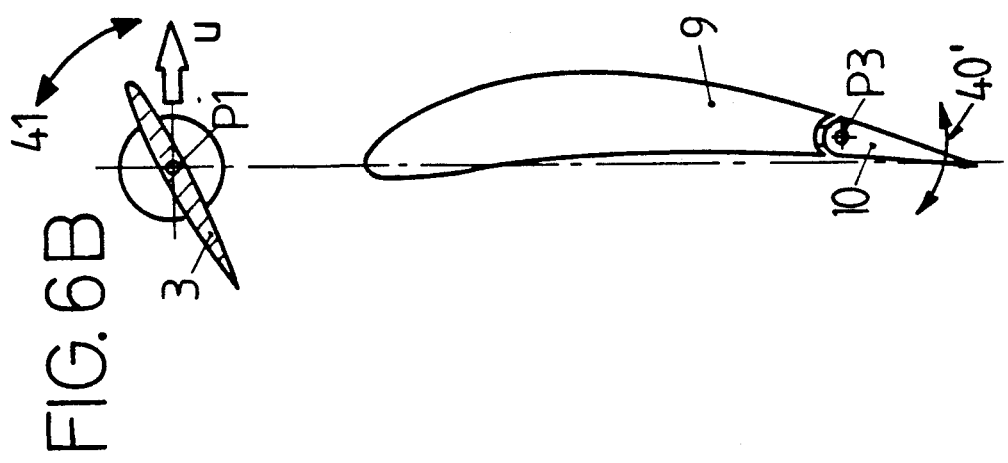
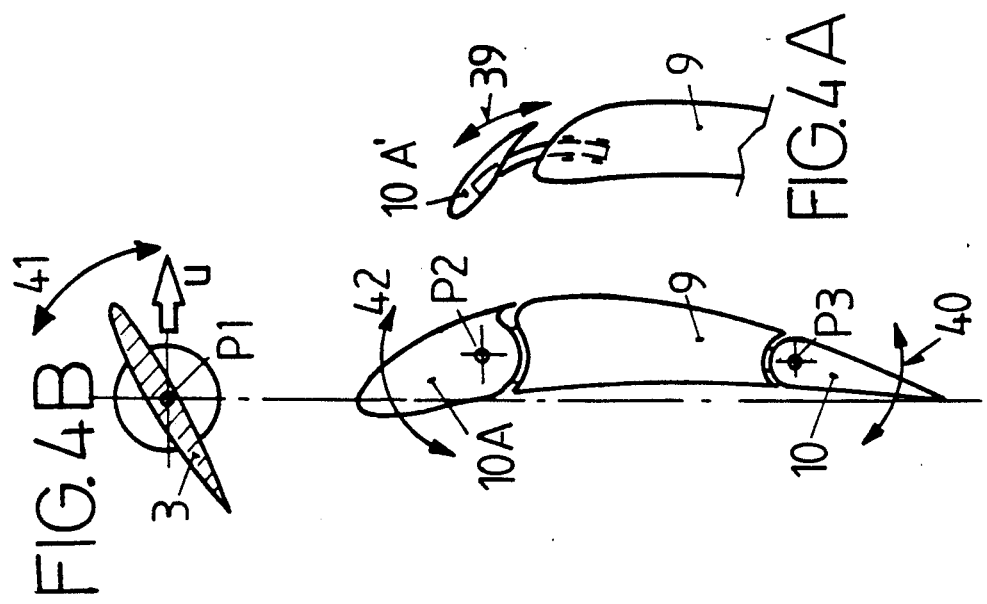

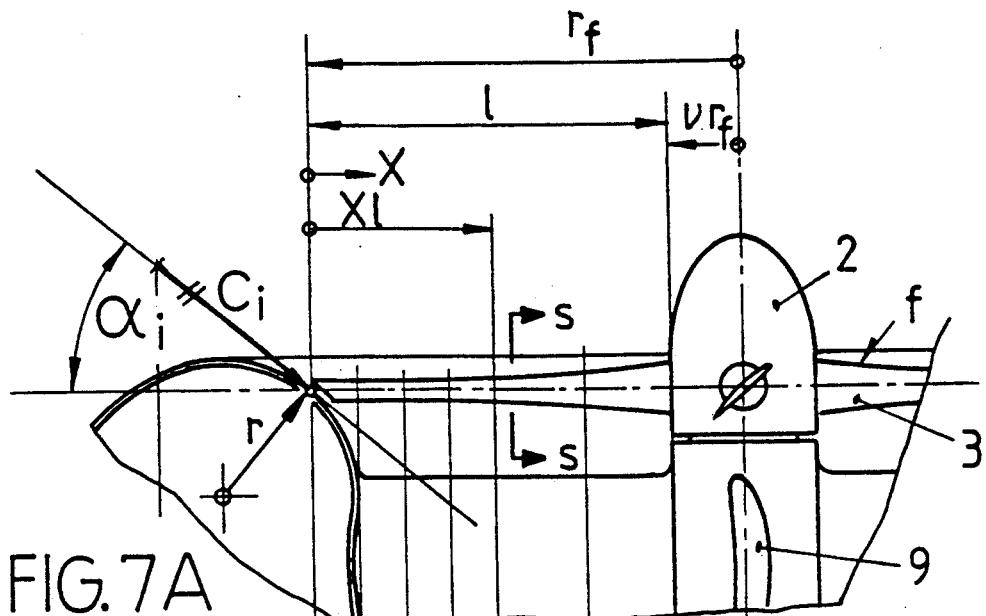
FIG. 7A
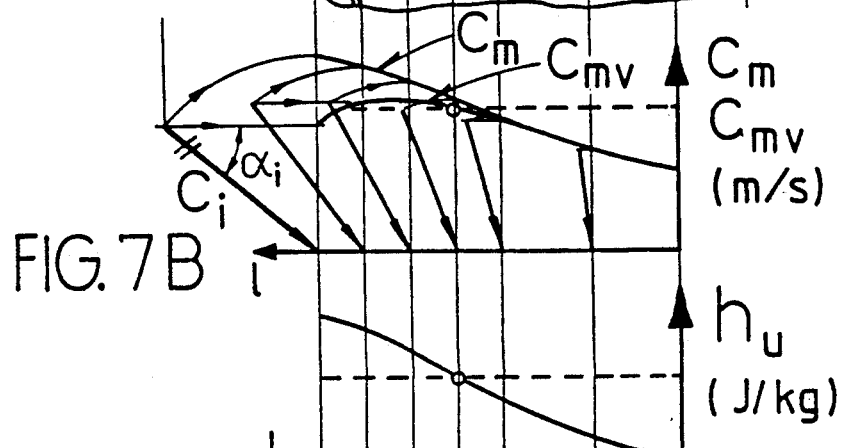
FIG. 7B
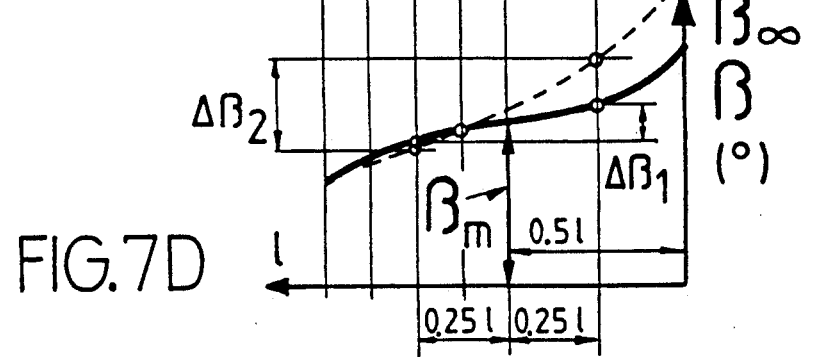
FIG. 7C
FIG. 7D
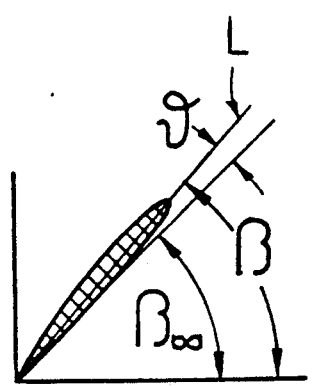
FIG. 7E

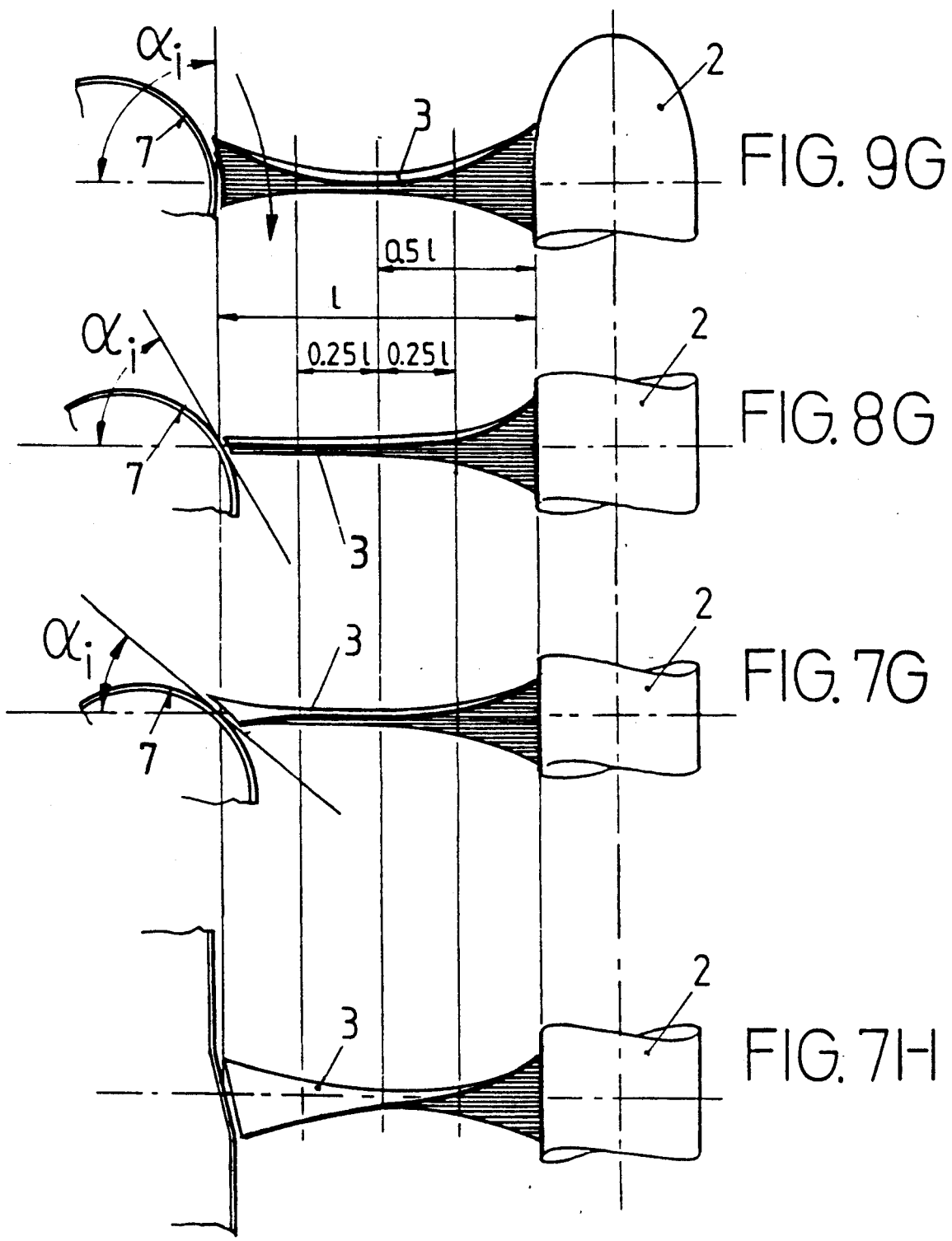

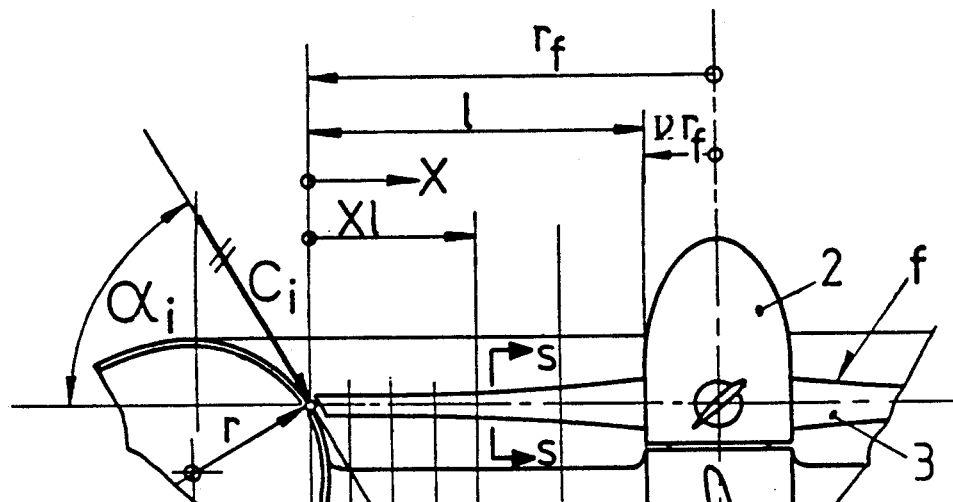
FIG. 8A
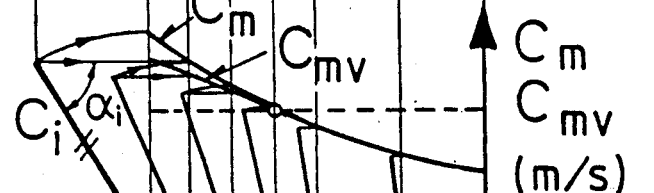
FIG. 8B
FIG. 8C
FIG. 8D
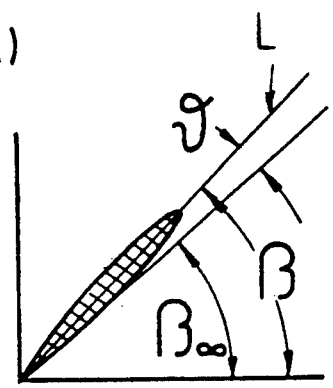
FIG. 8E

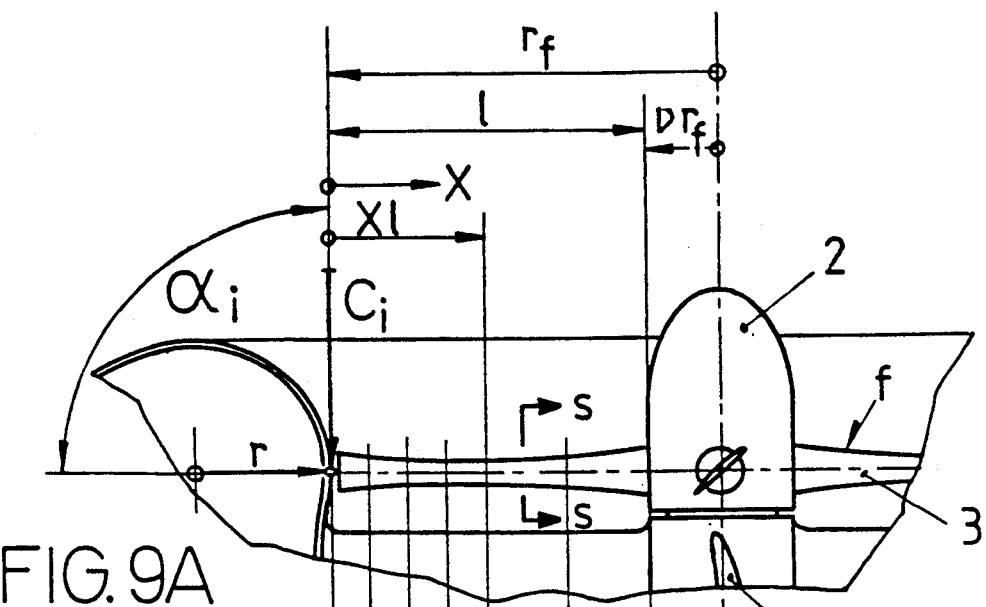
FIG. 9A
FIG. 9B
FIG. 9C
FIG. 9D
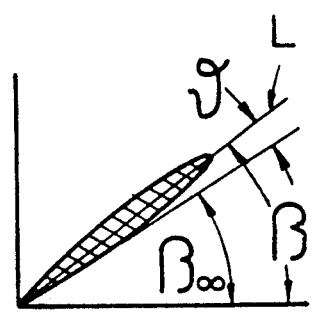
FIG. 9E

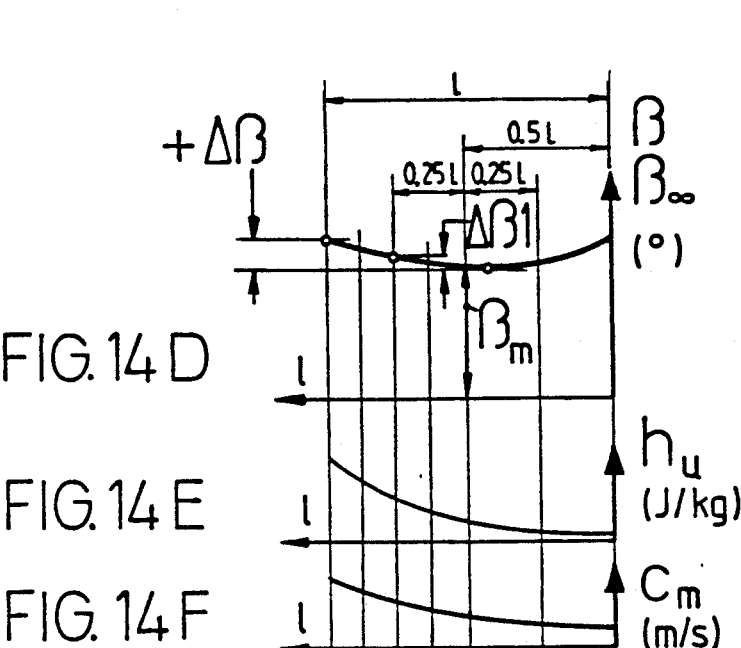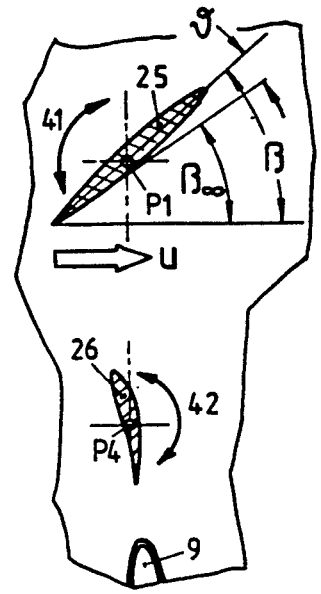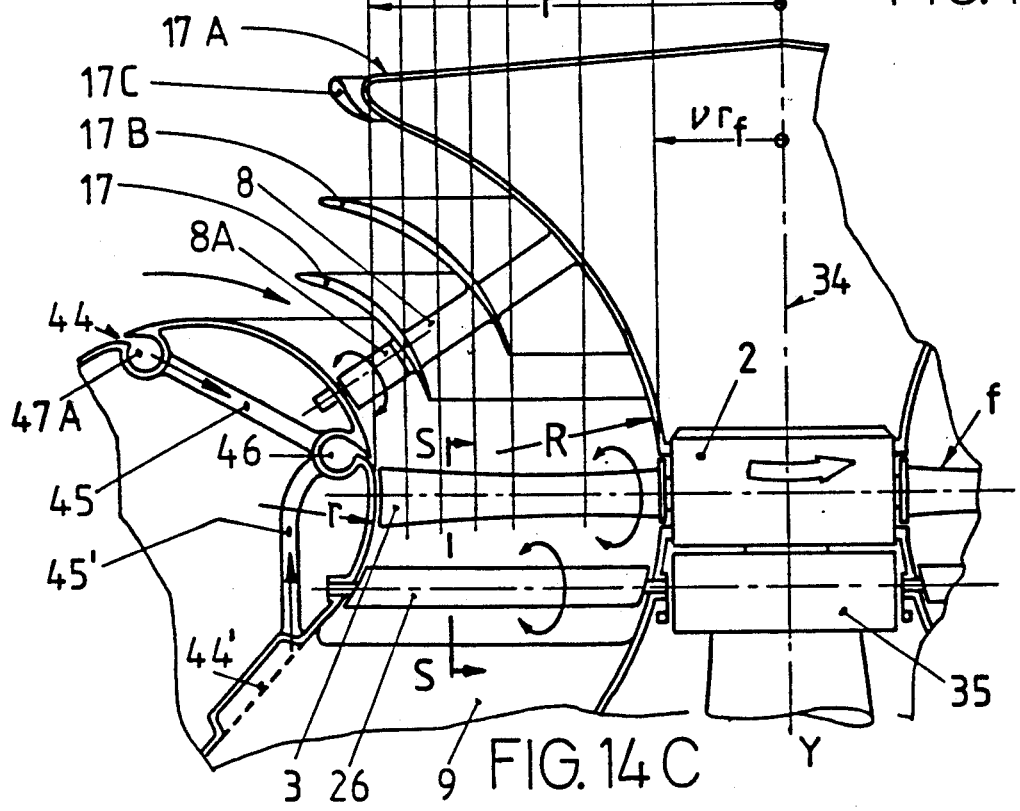

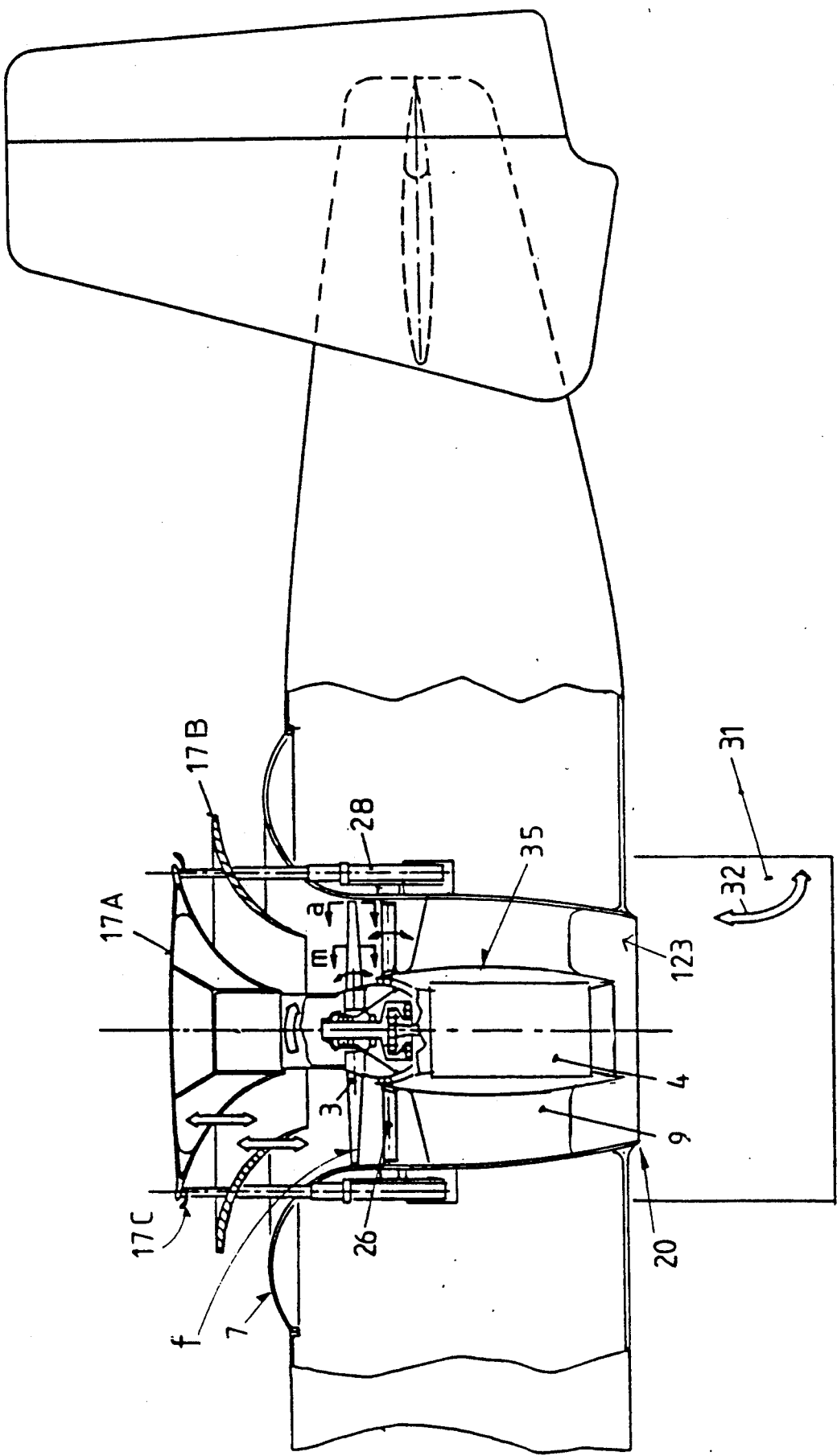

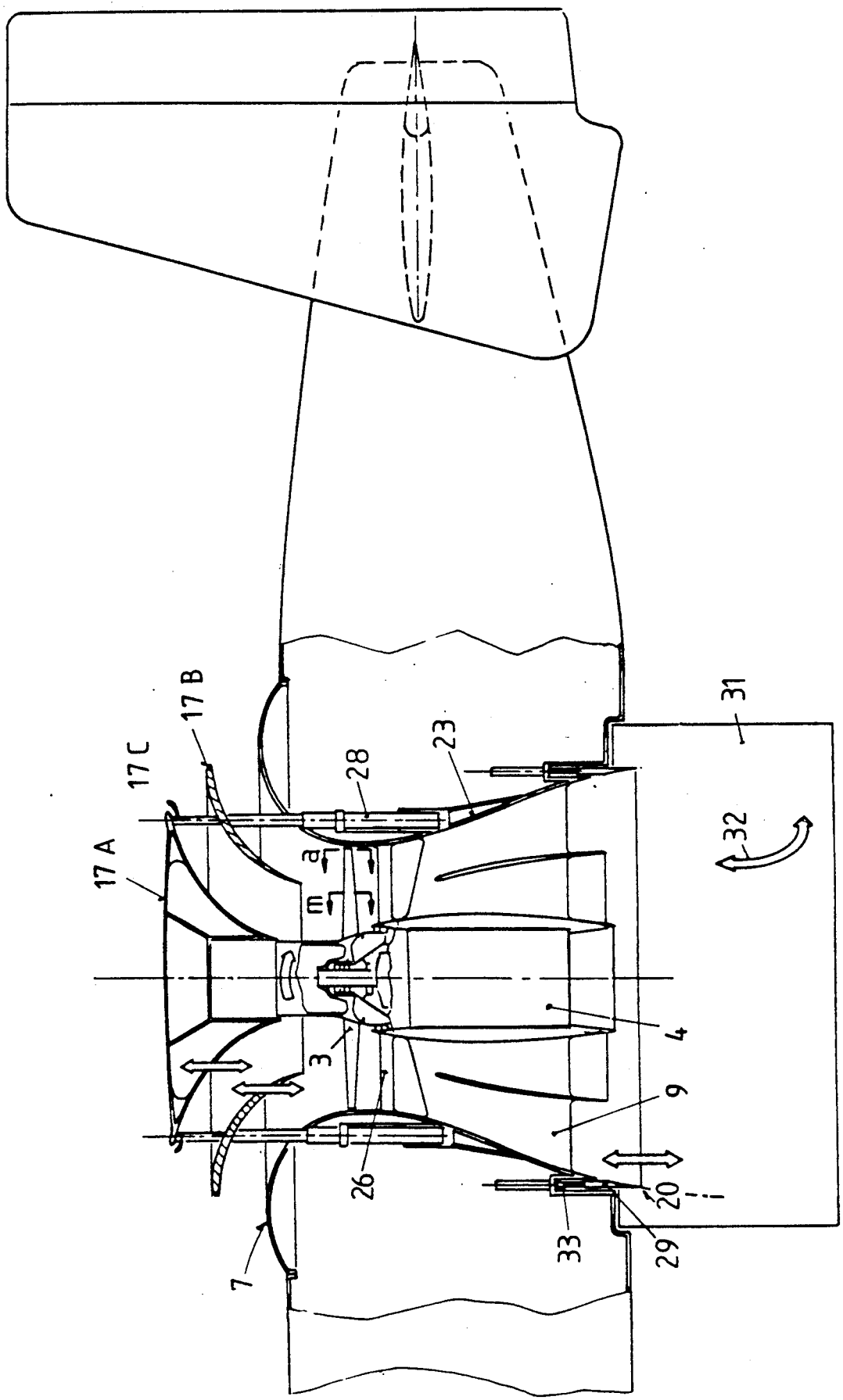

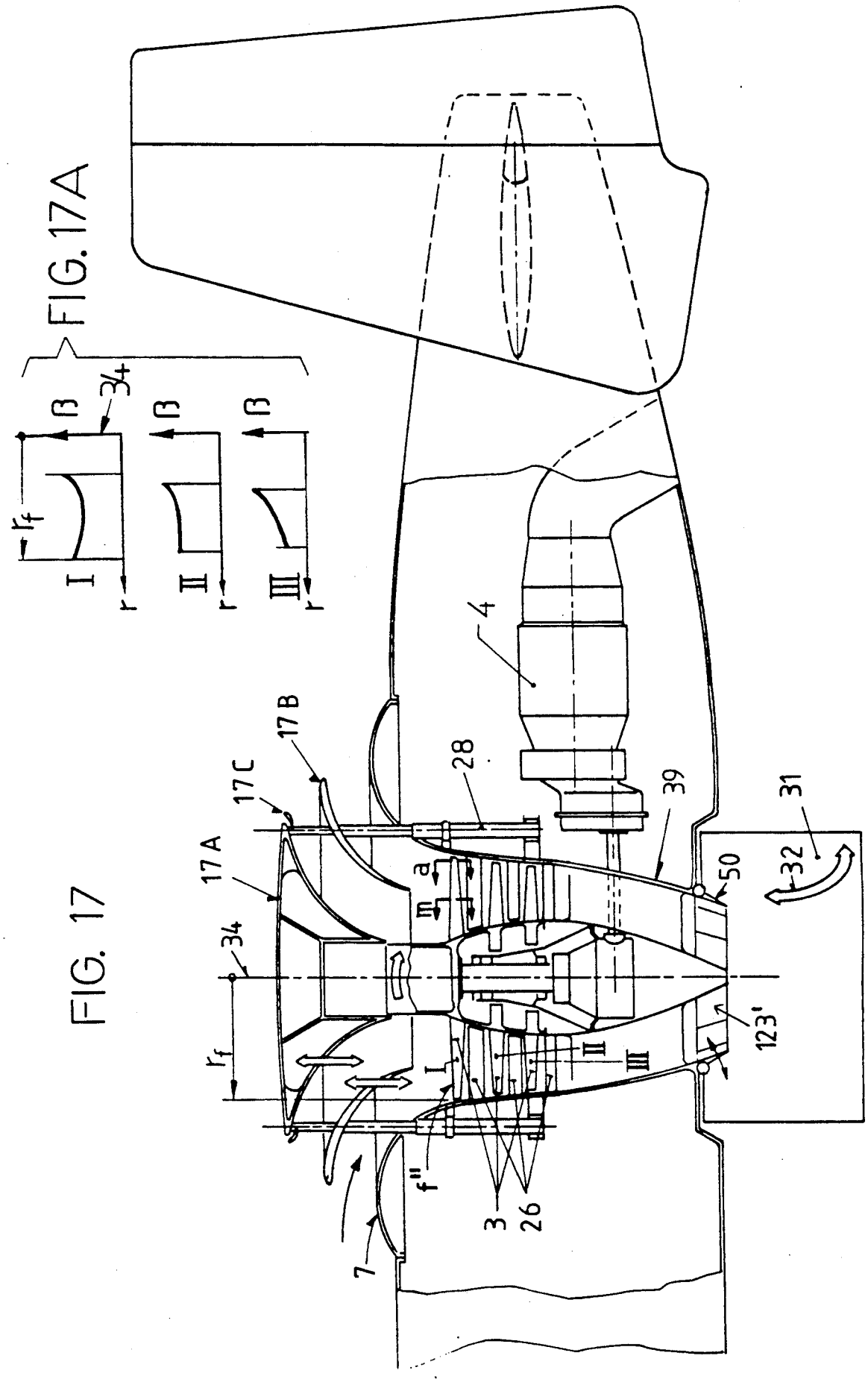

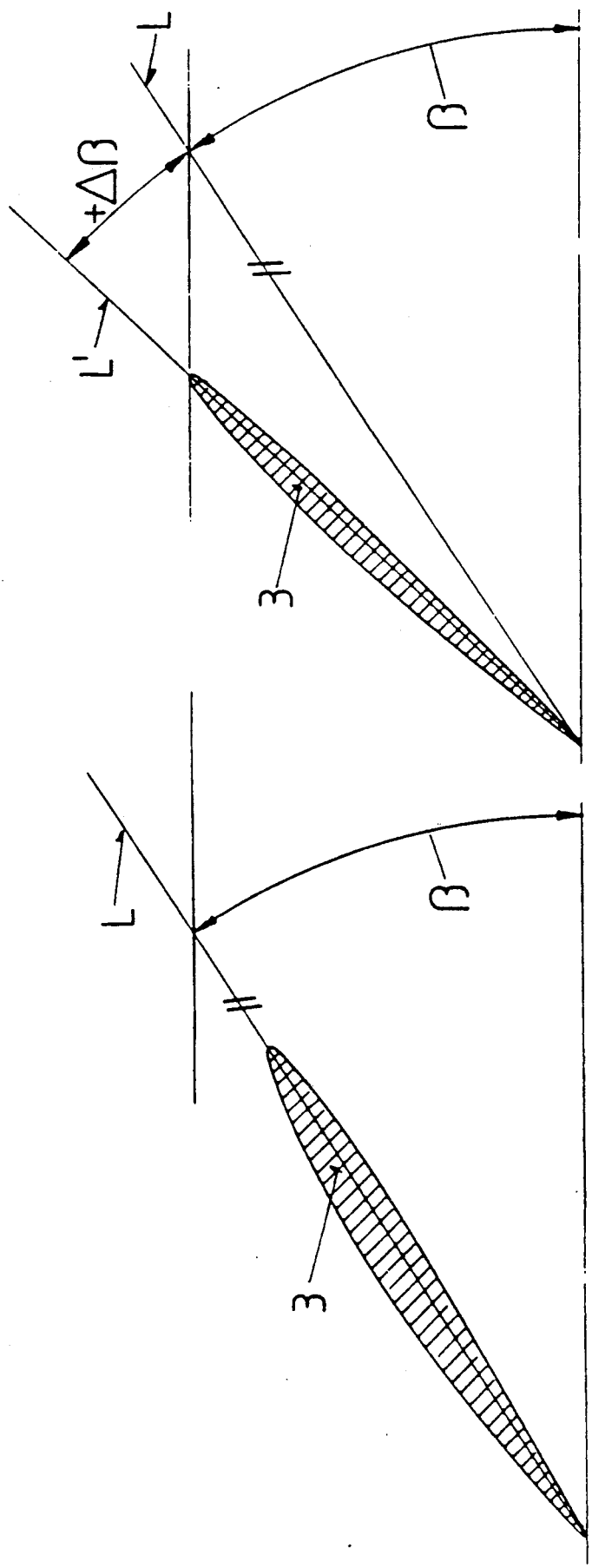

FREE STANDING OR AIRCRAFT LIFT GENERATOR

CROSS REFERENCE TO RELATED APPLICATIONS

This application is a continuation-in-part of Ser. No. 07/010,360 filed Feb. 3, 1987 now U.S. Pat. No. 4,796,836 and based, in turn, on Ser. No. 06/834,799 filed Feb. 28, 1986, now abandoned.

FIELD OF THE INVENTION

This invention relates to a lifting engine for use as a free standing or aircraft lift generator in selfsustaining fully controllable flying machine or as an auxiliary vertical lift producing engine in an aircraft comprising a convexly curved inlet fairing of rotational symmetry shrouding an axial fan with a close gap distance of less than 1/25 of the fan tip diameter and where thus a difference of total pressures between the inflow front side and the exit flow rear side is increased radially from hub to tip.

BACKGROUND OF THE INVENTION

A lifting engine of that type for example is known from U.S. Pat. No. 3,489,374, which is a typical design representative for many similar designs in the literature.

All these designs have the disadvantage in common, that the part of the thrust, which stems from the underpressure acting on the convexly curved inlet fairing is small, whereas the major part of the thrust is generated within the narrow diameter of the axial fan (propeller) as the difference of total pressures between suction side and pressure side. This fact causes a small ratio of "lifting force F to engine power P", shortly designated as F/P and therefore a more high specific fuel consumption. Furthermore there is the disadvantage of less positional stability during hovering flight due to small amount of stabilizing aerodynamic underpressure forces acting on big radii from the fan center line on the inlet fairing.

The different designs of inlet fairings in the state of the art show endeavors to keep that disadvantage small, but there was never an attempt to involve the geometry of the fan blades.

OBJECT OF THE INVENTION

The object of the invention is to achieve more lifting force with a given amount of power by reinforcement of the part thrust of the underpressure acting on the upper surface of the inlet fairing involving the blade geometry of the lifting fan. As a side effect, these features of the invention achieve also an increase of flight position stability during hovering flight.

SUMMARY OF THE INVENTION

For the realization of this task, the invention recognizes that commonly known state of the art lifting engines have axial fans, which are designed according to one of the available standard theories either to the "free vortex blading" or to the theory "degree of reaction=-constant over radius" and derivatives of these theories. These state of the art theories have an effect on fan blade geometry in common, according to which the angle ($\beta$) between the fan blade airfoil chord line and the circumferential direction or rotation decreases continuously from hub to tip, whereas the difference of pressures between the inflow area of the axial runner and its exit area is approximately constant in radial direction or even decreases slightly in radial direction from hub to tip, but never increases, in the outer radial region.

According to the invention by choice of the distribution of the radius (r) of the inlet fairing, the choice of tangent angle ($\alpha_i$) at a place oppositely to the fan rotor blade tip, the hub radius ($\nu \cdot r_f$), the tip radius ($r_f$) of the fan rotor and the radial distribution of the design parameters of the rotor blades, that is the number of blades, airfoil shape and blade angle ($\beta$), the difference of the total pressure between inflow front side and the exit flow rear side, is caused to radially increase from inner radii towards the fan tip radius. Thus a radial lifting force distribution, which has a greater value at outer radii compared with inner radii allows an increase of the underpressure lifting force acting on the inlet fairing causing also more flight position stability.

If a designer of a lifting fan is required to increase the pressure difference from hub to tip, that requirement is equivalent with the boundary condition to increase the meridional velocity from hub to tip. To achieve that, the angle of the airfoil chord lines against the circumferential direction of rotation increases from a defined radial mid section of the fan blade towards the tip (the mid section is defined as a range between 25 and 75 percent of the length (l) of the rotor blade) or stays at least constant from that mid section towards the tip.

In nonshrouded fans, that is the category of free propellers in the open air stream, to which the invention does *not* belong, there are very different conditions effective. In these cases a constant airfoil chord angle against the circumferential direction of rotation (equivalent to a zero-twist) is possible in the outer radial regions of the blades.

Preferably by such a selection of the mentioned parameters, there is a radial increase of the specific energy ($h_u$) representative for the pressure difference from inner radii towards the fan tip radius along a rotor blade for a ratio of at least 1.5 times, preferably 2 times to more than 3 times and, in specific cases, 5 to 10 times.

Particularly advantageously the tangent angle ($\alpha_i$) is between 50° and 90° and the blade angle ($\beta$) of the airfoil chord line against the circumferential direction of rotation, present between a radial mean range of the rotor blade length (l) defined as (0.5 l±0.25 l) towards the fan tip radius, will increase towards outer radii for an increment of 0° to 20°, preferably between 0° to 9° degrees.

According to the field of application of the lift engine of the invention, there are also designs of highly concentrated power possible. In this case it is suitable—as known in the state of the art—that the fan rotor comprises at least two or more axial stages. For such a multi stage axial compressor l prefer a construction wherein, in a multistage axial compressor the increment of the blade angle ($\beta$) from a mean radial range towards the fan tip radius will reduce from an initial positive value at the first stage down to the following stages and might even become a negative value with continuing stage number and where the function of the radial distribution of ($\beta$) has no turning point at the last stage and where the direction of rotation of adjacent stages might alternate—and seen along the direction of the flow—the first stage blade cascade contains the features of the invention to a greater degree, whereas the last stage blades show these features to a lesser degree.

As mentioned already, the key for a lifting engine according to the invention represented herein is to increase the radial lift distribution from hub to tip, where the shape of the fan rotor is determined as described above in general and where also preferable use is made from the geometry conditions stated below:

the part of rotational symmetry of the inlet fairing commences at a radial distance, which is equivalent to 1.2 to 1.5 times of the fan tip radius ($r_f$), preferably at the 1.3 to 1.4 times tip radius of the fan (f) and the convexly curved part of the inlet fairing, which has rotational symmetry, terminates downstream of the fan (f) at an axial distance, ranging from 0.1 to 0.3 times of the fan tip radius, preferably approximately 0.2 times ($r_f$);

If there are no inlet guide shields in the design and the inlet side of the fan is open, the fan blade assembly can be positioned so high above the minimum diameter ($r_k$ min.) of the inlet fairing that the tangent angle ($\alpha_i$)—measured against a horizontal plane—will be 30° to 70° preferably 40° to 60°; or in the case of the presence of a curved inlet flowpath of rotational symmetry with inlet guide shields under some conditions the value of $\alpha_i$ can be 55° to 90°, preferably 70° to 90°;

the convex curvature of the inlet fairing contour will merge within an axial distance of $0.3 \cdot r_f$ ($r_f$=fan tip radius) into the contour of the exit channel which ends with a sharp trailing edge directed approximately downwards, where the exit channel can be an exit diffuser in some cases equipped with a retractable trailing edge;

the exit channel downstream of the fan (f) can be subdivided into at least two channels whose cross section defined vertically to the fan axis will deviate from the circular shape and also from the circular symmetry;

at least one of the inlet guide shields can move in the direction of the axis of the fan (f; f') by means of telescopes and where the fan inlet area can be covered as seen from top if the shield is retracted; and the rotor of the axial compressor can have rotor blades whose blade angle ($\beta$) is adjustable in a cyclic and collective manner, while downstream of this rotor guide vanes are linked to be adjustable and synchronous to the foregoing rotor blades, operated in the same manner and rudders can be provided in addition to this mechanism.

It is possible to have a radial subdivision of the rotor blades of the invention, which allows the employment of more blades in the radial outer portion of the fan in order to achieve less deviation from rotational symmetry of the flow and for other reasons.

Particularly, at least a part of the rotor blades is subdivided by a coaxial ring and that there are at least one of the following three properties applied in this design:

a) The number of blades within the ring is less than the number of blades outside of the ring;

b) The rotor blades within the ring are rigid around their blade axis, whereas the rotor blades outside the ring are adjustable in a cyclic and/or collective manner for the purpose of the adjustment of the blade angle; and c) The distribution of the blade angle ($\beta$) over the entire length of the rotor blades from hub to tip is selected in a manner such, that the pressure difference between inflow front side and exit flow rear side radially increases from hub to tip.

According to another feature of the invention, the ratio of the tangents of the blade angle ($\beta$) at the fan tip radius in relation to the tangents of the blade angle ($\beta$) in a relative distance X from the outermost radius towards inner radii is described approximately by the following general correlation, which is valid for both types of inlets—the free open inlet FIGS. 1, 2, 3, 12) and for the curved inlet flowpath (FIGS. 14A, 15, 16, 17):

$$tg\beta_i/tg\beta_x = A \cdot e^B \cdot C$$

wherein $\beta_i$ = angle of the airfoil chord line (blade angle) at the outermost radius (fan tip radius)

$\beta_x$ = blade angle in a relative distance X (X is running from the value "0" to "1" of the relative blade length $1=1$) from the outermost radius towards the hub.

A = the expression $$1 - X\left(1 - \frac{\text{rotor-hub radius}}{\text{rotor-tip radius}}\right) = 1 - X(1 - \nu)$$

and

B and C' are geometry factors in dependence of the curvature radius of the inlet fairing oppositely to the fan tip radius and in dependence of the fan tip radius and the tangent angle $\alpha_j$ oppositely to the fan tip radius.

in the case of an open "free" inlet seen from top (FIGS. 1, 2, 3) the tangents of the blade angle $\beta_{\infty j}$ at the outermost radius in relation to the tangents of the blade angle $\beta_{\infty x}$ in the relative distance from outermost radius towards the inner radii on stations X will be $$tg\beta_{\infty i}/tg\beta_{\infty x} = A \cdot e^B \cdot C \cdot D \qquad \text{E1}$$

where there is $tg\beta_i/tg\beta_x \approx tg\beta_{\infty i}/tg\beta_{\infty x}$ with the auxiliary functions $$\Delta\alpha = \arctg \frac{Xr_f(1-\nu)\cos\alpha_i}{r - Xr_f(1-\nu)\sin\alpha_i}$$

$$\Delta\alpha_{max.} = \arctg \frac{r_f(1-\nu)\cos\alpha_i}{r - Xr_f(1-\nu)\sin\alpha_i}$$

$$\alpha_x = \alpha_i - \Delta\alpha - X(90 - \alpha_i - \Delta\alpha_{max.})$$

$$r_{ix} = r_f - r(\cos(90 - \alpha_i - \Delta\alpha) - \cos(90 - \alpha_i))$$

$$r_{fx} = r_f(1 - X(1 - \nu))$$

$$m = r_{ix} - r_{fx}$$

$$q = \frac{m}{\cos(90 - \alpha_i - \Delta\alpha)}$$

$$r_x = r(1 - f_1 tg(X \, 90°)) + q$$

$$q_a = \left(\frac{r+q}{\cos\Delta\alpha} - r\right)\left(1 - \left(\frac{f_2}{(\alpha_i/90)^2} - f_2\right)X\right)$$

$$C = \frac{q(r_f(1 - X(1 - )) + m/2)}{q_a(r_f - 0.5q_a\cos(90 - \alpha_i - (0.5 - X0.5)\Delta\alpha))}$$

$$B = 0.5q(1/r + 1/r_x)$$

$$A = 1 - X(1 - \nu)$$

$$D = \frac{\sin\alpha_i}{\sin\alpha_x}$$

where there is $a_i$ = angle of the tangent of the outer meridional contour at a place oppositely to the fan tip radius
r = curvature radius of the meridional contour in the same place
$r_f$ = fan tip radius
$\nu$ = "hub/tip"—ratio = $r_n/r_f$ e = base of natural logarithm.

The ratio of the relevant parameters corresponds approximately at least to values in the table below when $a_i = 40°$ (FIGS. 7B, 7D):

TABLE 1

| | | | | | | |
|---|---|---|---|---|---|---|
| rf | 1.0000 | 1.0000 | 1.0000 | 1.0000 | 1.0000 | 1.0000 |
| r | 0.3100 | 0.3100 | 0.3100 | 0.3100 | 0.3100 | 0.3100 |
| $\nu$ | 0.2000 | 0.2000 | 0.2000 | 0.2000 | 0.2000 | 0.2000 |
| X | 0.1250 | 0.2500 | 0.3750 | 0.5000 | 0.7500 | 0.9999 |
| $\alpha_i$ | 40.0000 | 40.0000 | 40.0000 | 40.0000 | 40.0000 | 40.0000 |
| f1 | 3.0000 | 3.0000 | 3.0000 | 3.0000 | 3.0000 | 3.0000 |
| f2 | 0.0200 | 0.0200 | 0.0200 | 0.0200 | 0.0200 | 0.0200 |
| $\Delta\alpha$ | 11.5671 | 19.2567 | 24.5620 | 28.3828 | 33.4525 | 36.6307 |
| $\Delta\alpha_{max}$ | 36.6317 | 36.6317 | 36.6317 | 36.6317 | 36.6317 | 36.6317 |
| $\Delta\alpha_x$ | 53.2381 | 62.5988 | 69.5751 | 75.0669 | 83.4787 | 89.9976 |
| $r_{ix}$ | 0.9564 | 0.9328 | 0.9193 | 0.9111 | 0.9021 | 0.8977 |
| $r_{fx}$ | 0.9000 | 0.8000 | 0.7000 | 0.6000 | 0.4000 | 0.2001 |
| m | 0.0564 | 0.1328 | 0.2193 | 0.3111 | 0.5021 | 0.6976 |
| q | 0.0720 | 0.1545 | 0.2429 | 0.3346 | 0.5238 | 0.7170 |
| $r_x$ | 0.5670 | 0.8498 | 1.1743 | 1.5746 | 3.0790 | 5,921.5908 |
| $q_a$ | 0.0791 | 0.1784 | 0.2888 | 0.4055 | 0.6473 | 0.8910 |
| C | 0.8698 | 0.8074 | 0.7746 | 0.7583 | 0.7555 | 0.7796 |
| B | 0.1797 | 0.3402 | 0.4951 | 0.6459 | 0.9299 | 1.1565 |
| A | 0.9000 | 0.8000 | 0.7000 | 0.6000 | 0.4000 | 0.2001 |
| D | 0.8024 | 0.7240 | 0.6859 | 0.6653 | 0.6470 | 0.6428 |
| $c_{miv}/c_{mxv}$ | 0.8353 | 0.8215 | 0.8717 | 0.9623 | 1.2387 | 1.5930 |
| tg $Boo_i$/tg $Boo_x$ | 0.7518 | 0.6572 | 0.6102 | 0.5774 | 0.4955 | 0.3187 |

Alternatively the ratio of relevant parameters corresponds approximately at least to values in the table below when $a_i$ is 60° (FIGS. 8B, 8D):

TABLE 2

| | | | | | | |
|---|---|---|---|---|---|---|
| rf | 0.9308 | 0.9308 | 0.9308 | 0.9308 | 0.9308 | 0.9308 |
| r | 0.3100 | 0.3100 | 0.3100 | 0.3100 | 0.3100 | 0.3100 |
| $\nu$ | 0.2149 | 0.2149 | 0.2149 | 0.2149 | 0.2149 | 0.2149 |
| X | 0.1250 | 0.2500 | 0.3750 | 0.5000 | 0.7500 | 0.9999 |
| $\alpha_i$ | 60.0000 | 60.0000 | 60.0000 | 60.0000 | 60.0000 | 60.0000 |
| f1 | 3.0000 | 3.0000 | 3.0000 | 3.0000 | 3.0000 | 3.0000 |
| f2 | 0.0200 | 0.0200 | 0.0200 | 0.0200 | 0.0200 | 0.0200 |
| $\Delta\alpha$ | 6.6947 | 11.0394 | 14.0548 | 16.2588 | 19.2518 | 21.1820 |
| $\Delta\alpha_{max}$ | 21.1827 | 21.1827 | 21.1827 | 21.1827 | 21.1827 | 21.1827 |
| $\Delta\alpha_x$ | 67.7969 | 73.2437 | 77.3613 | 80.6674 | 85.8648 | 89.9985 |
| $r_{ix}$ | 0.9146 | 0.9061 | 0.9012 | 0.8981 | 0.8947 | 0.8929 |
| $r_{fx}$ | 0.8395 | 0.7481 | 0.6568 | 0.5654 | 0.3827 | 0.2001 |
| m | 0.0751 | 0.1580 | 0.2444 | 0.3327 | 0.5120 | 0.6928 |
| q | 0.0818 | 0.1670 | 0.2542 | 0.3425 | 0.5211 | 0.7011 |
| $r_x$ | 0.5768 | 0.8623 | 1.1856 | 1.5825 | 3.0763 | 5,921.5750 |
| $q_a$ | 0.0842 | 0.1749 | 0.2691 | 0.3651 | 0.5597 | 0.7550 |
| C | 0.9538 | 0.9288 | 0.9146 | 0.9096 | 0.9034 | 0.9099 |
| B | 0.2028 | 0.3663 | 0.5172 | 0.6607 | 0.9252 | 1.1309 |
| A | 0.9019 | 0.8037 | 0.7056 | 0.6075 | 0.4112 | 0.2150 |
| D | 0.9354 | 0.9044 | 0.8875 | 0.8776 | 0.8683 | 0.8660 |
| $c_{miv}/c_{mxv}$ | 1.0927 | 1.2116 | 1.3616 | 1.5411 | 1.9787 | 2.4415 |
| tg $Boo_i$/tg $Boo_x$ | 0.9855 | 0.9738 | 0.9607 | 0.9361 | 0.8136 | 0.5249 |

In another alternative the ratio of relevant parameters corresponds approximately at least to values in the table below when $\alpha_i$ approaches 90° (FIGS. 9B, 9D):

TABLE 3

| | | | | | | |
|---|---|---|---|---|---|---|
| rf | 0.8893 | 0.8893 | 0.8893 | 0.8893 | 0.8893 | 0.8893 |
| r | 0.3100 | 0.3100 | 0.3100 | 0.3100 | 0.3100 | 0.3100 |
| $\nu$ | 0.2249 | 0.2249 | 0.2249 | 0.2249 | 0.2249 | 0.2249 |
| X | 0.1250 | 0.2500 | 0.3750 | 0.5000 | 0.7500 | 0.9999 |
| $\alpha_i$ | 89.9990 | 89.9990 | 89.9990 | 89.9990 | 89.9990 | 89.9990 |
| f1 | 3.0000 | 3.0000 | 3.0000 | 3.0000 | 3.0000 | 3.0000 |
| f2 | 0.0200 | 0.0200 | 0.0200 | 0.0200 | 0.0200 | 0.0200 |
| $\Delta\alpha$ | 0.0002 | 0.0004 | 0.0005 | 0.0005 | 0.0006 | 0.0007 |
| $\Delta\alpha_{max}$ | 0.0007 | 0.0007 | 0.0007 | 0.0007 | 0.0007 | 0.0007 |
| $\Delta\alpha_x$ | 89.9993 | 89.9994 | 89.9996 | 89.9997 | 89.9999 | 90.0000 |
| $r_{ix}$ | 0.8893 | 0.8893 | 0.8893 | 0.8893 | 0.8893 | 0.8893 |
| $r_{fx}$ | 0.8031 | 0.7170 | 0.6300 | 0.5447 | 0.3723 | 0.2001 |
| m | 0.0862 | 0.1723 | 0.2585 | 0.3446 | 0.5170 | 0.6892 |
| q | 0.0862 | 0.1723 | 0.2585 | 0.3446 | 0.5170 | 0.6892 |
| $r_x$ | 0.5812 | 0.8675 | 1.1899 | 1.5846 | 3.0722 | 5,921.5631 |
| $q_a$ | 0.0862 | 0.1723 | 0.2585 | 0.3446 | 0.5170 | 0.6892 |
| C | 1.0000 | 1.0000 | 1.0000 | 1.0000 | 1.0000 | 1.0000 |
| B | 0.2131 | 0.3773 | 0.5255 | 0.6646 | 0.9180 | 1.1117 |
| A | 0.9031 | 0.8062 | 0.7093 | 0.6125 | 0.4187 | 0.2250 |

TABLE 3-continued

| D | 1.0000 | 1.0000 | 1.0000 | 1.0000 | 1.0000 | 1.0000 |
|---|---|---|---|---|---|---|
| $c_{miv}/c_{mxv}$ | 1.2375 | 1.4583 | 1.6914 | 1.9438 | 2.5042 | 3.0396 |
| tg Boo$_i$/tg Boo$_x$ | 1.1176 | 1.1757 | 1.1997 | 1.1905 | 1.0484 | 0.6838 |

In the case of a curved inlet flowpath of rotational symmetry (FIGS. 14A, 15, 16, 17) the radial distribution of the blade angle ($\beta$) can be described approximately by the following correlation:

The tangents of the radially outermost relative flow angle ($\beta_{\infty i}$) of the rotor blades—in case of a multi stage compressor those of the first stage—in relation to the corresponding angle ($\beta_{\infty x}$) in the relative distance (X) downwards to inner radii will be $$tg\beta_{\infty i}/tg\beta_{\infty x} = (1-X(1-\nu))\cdot e^B \qquad E2$$

where $tg\beta_i/tg\beta_x \approx tg\beta_{\infty i}/tg\beta_{\infty x}$ and $$B = 0.5Xr_f(1-\nu)\left(\frac{1}{r} + \frac{1}{(R-r)(X-f3\sin(X180))}\right)$$

$r_f$ = fan tip radius
r = curvature radius of the meridional contour opposite to the fan blade tip
R = curvature radius of the meridional contour at the hub at the intersection with the fan blade axis
$\nu$ = "hub/tip"—ratio = $r_n/r_f$
f3 = 0.2, a rigid constant and where the angle ($\alpha_i$) of the outer meridional contour will preferably have an amount of 77° to 90°.

The ratio of relevant parameters can correspond at least approximately to the values in the table below (FIGS. 14D, 14F):

TABLE 4

| rf | 1.0000 | 1.0000 | 1.0000 | 1.0000 | 1.0000 | 1.0000 | 1.0000 |
|---|---|---|---|---|---|---|---|
| r | 0.4100 | 0.4100 | 0.4100 | 0.4100 | 0.4100 | 0.4100 | 0.4100 |
| R | 0.8600 | 0.8600 | 0.8600 | 0.8600 | 0.8600 | 0.8600 | 0.8600 |
| X | 0.0000 | 0.1250 | 0.2500 | 0.3750 | 0.5000 | 0.7500 | 1.0000 |
| $\nu$ | 0.3000 | 0.3000 | 0.3000 | 0.3000 | 0.3000 | 0.3000 | 0.3000 |
| f3 | 0.2000 | 0.2000 | 0.2000 | 0.2000 | 0.2000 | 0.2000 | 0.2000 |
| A | 1.0000 | 0.9125 | 0.8250 | 0.7375 | 0.6500 | 0.4750 | 0.3000 |
| $r_x$ | 0.4100 | 0.5007 | 0.5861 | 0.6619 | 0.7250 | 0.8111 | 0.8600 |
| B | 0.0000 | 0.1941 | 0.3627 | 0.5184 | 0.6682 | 0.9639 | 1.2606 |
| $c_{miv}/c_{mx}$ | 1.0000 | 1.2142 | 1.4372 | 1.6794 | 1.9507 | 2.6218 | 3.5277 |
| tg Boo$_i$/tg Boo$_x$ | 1.0000 | 1.1080 | 1.1857 | 1.2385 | 1.2680 | 1.2454 | 1.0583 |

Alternatively (i.e. for a different value r) the ratio of relevant parameters corresponds at least approximately to the values in the table below:

TABLE 5

| rf | 1.0000 | 1.0000 | 1.0000 | 1.0000 | 1.0000 | 1.0000 | 1.0000 |
|---|---|---|---|---|---|---|---|
| r | 0.3100 | 0.3100 | 0.3100 | 0.3100 | 0.3100 | 0.3100 | 0.3100 |
| R | 0.8600 | 0.8600 | 0.8600 | 0.8600 | 0.8600 | 0.8600 | 0.8600 |
| X | 0.0000 | 0.1250 | 0.2500 | 0.3750 | 0.5000 | 0.7500 | 1.0000 |
| $\nu$ | 0.3000 | 0.3000 | 0.3000 | 0.3000 | 0.3000 | 0.3000 | 0.3000 |
| f3 | 0.2000 | 0.2000 | 0.2000 | 0.2000 | 0.2000 | 0.2000 | 0.2000 |
| A | 1.0000 | 0.9125 | 0.8250 | 0.7375 | 0.6500 | 0.4750 | 0.3000 |
| $r_x$ | 0.3100 | 0.4208 | 0.5253 | 0.6179 | 0.6950 | 0.8003 | 0.8600 |
| B | 0.0000 | 0.2451 | 0.4488 | 0.6358 | 0.8163 | 1.1748 | 1.5360 |
| $c_{miv}/c_{mx}$ | 1.0000 | 1.2777 | 1.5665 | 1.8885 | 2.2621 | 3.2374 | 4.6460 |
| tg Boo$_i$/tg Boo$_x$ | 1.0000 | 1.1659 | 1.2924 | 1.3928 | 1.4704 | 1.5378 | 1.3938 |

A particular favorable feature of the rotor blade geometry arising from the required properties outlined above is expressed as follows:

the ratio of the mean blade angle ($\beta_m$), defined as the airfoil chord angle of the airfoil against the circumferential direction of rotation at a radial station of half (0.5·l) of the blade length (l) in relation to the blade angle difference of ($\Delta\beta_1$), defined as the angular difference of ($\beta$) over a mean range of the blade length, expressed as (0.5·l)±(0.25·l) (in words: half length plus-minus a quarter length) will have at least a value of 3.8, preferably 8 to 12 whereby a low twist of the fan blades in their radial midsection is defined.

Before we start detailed description of the invention based upon examples represented in the drawing, a brief theoretical background is described.

There are six deficiencies hidden in the state of the art literature as detected in various papers of scientific institutes and well known aircraft engine companies and which deficiencies can also be recognized in the thrust measuring methods on test rigs presently.

These deficiencies of the state of the art literature, which have been discovered by me, concern the thrust force balance of all different types of aircraft jet engines, particularly the thrust at start condition of all jet engines and the hovering flight of lifting engines.

Deficiency Nbr. 1:

The derivation and use of the common known simplified thrust formula $F = \dot{m}\cdot(c_a - c_0)$ represents the thrust F in N (Newton) as the difference of the exit momentum force $\dot{m}\cdot c_a$ minus the braking inlet momentum force $\dot{m}\cdot c_0$, where $\dot{m}$ = mass flow of air in kg/s neglecting the mass flow increase in the exit due to the addition of fuel
$c_a$ = jet exit velocity defined relatively against the jet engine
$c_0$ = flight velocity of the plane of control surface inlet velocity at a place infinitely far remoted in front of the jet engine given in m/s. If somebody, who cites the formula $F = \dot{m}\cdot(c_a - c_0)$ does not mention, that this type of force balance representation requires a position of the entrance of the control surface at infinity in front of the jet engine inlet, if one applies the momentum law this way, then misunderstandings are already incorporated.

Another important supposition for the application of the formula $F = \dot{m} \cdot (c_a - c_0)$ is the presence of friction free flow (potential flow) as a second requirement.

One can observe very often, that without mention of these two accompanying ideal suppositions authors of the criticized literature derive the static thrust at start condition by setting the flight velocity $c_0 = 0$.

Then the alleged take off thrust is according to the criticized literature $F = \dot{m} \cdot c_a$ (=deficiency Nbr. 1). It is correct that the inlet momentum force $\dot{m} \cdot c_0$ of an inlet control surface infinitely far in front of the jet engine inlet is equal to zero—under the supposition of having friction free flow—so that there remains $\dot{m} \cdot c_a$ only if $c_0 = 0$.

However, this abstract idealistic imagination is far from reality, as there exists no drag force in the potential flow for any body shape, because there is no separation foreseen in the potential flow theory.

For a clear and realistic force balance of a jet engine it is advisable to pull the control surface for the application of the momentum law close around the surface of the jet engine. At the air inlet it is advisable to recess the control surface into the inlet duct until it touches the vanes of the first (or only one) compressor stage, in order to make forces "visible", which act on the inlet fairing surface, whereas at the exit of the jet engine the control surface coincides with the end section of the exit nozzle.

One can define any control surface, but one cannot overlook or forget partial forces, because all forces acting on a once defined control surface must always cause the same resultant thrust, independent from the control surface definition.

With such a recommended closely drawn control surface we have beside the exit jet thrust force $\dot{m} \cdot c_a$ three essential forces in the inlet area: $T3' = \dot{m} \cdot c_i$ the braking or negative thrust producing inlet momentum force with $c_i$ as a mean meridional inlet velocity into the fan rotor area $A_r$, which is a part of the afore defined control surface. In the case of closely to the jet engine drawn control surfaces, there exists a thrust reducing inlet momentum force, which has to be deducted from $m \cdot c_a$ and where the mean velocity $\bar{c}_i$ is defined as a mean value for giving the same resultant inlet momentum force as the real unequal distribution of $c_m$ over the area $A_r$.

$$T3'' \approx 0.5 \cdot m \cdot c_i A_r \cdot \rho \cdot \frac{c_i^2}{2}$$

the thrust supporting underpressure force in front of the fan rotor, which compensates partially the braking inlet momentum force to approximately one half of it's value in the case of approximately parallel coaxial stream lines (only then the factor 0.5 is correct).

$$T1 \approx \pi \cdot \rho \cdot c_i^2 \cdot r_i^2 \cdot \ln\left(\frac{r_{a\,eff}}{r_i}\right) \cdot k_{F1}$$

This force T1 is the thrust supporting underpressure force over the inlet fairing surface, which should be gained as an integral "pressure times area-element" over the entire external jet engine surface, but which is concentrated primarily over the inlet fairing area in the case of take off starting conditions and in the case of hovering flight. It is remarkable, that there exists no formula for this type of force in the criticized literature, because one is not obeying this force as a consequence of the criticized deficiencies. The formula mentioned above is a simplified version of a foregoing more complex formula of the inventor. The meaning of coefficients and variables in the formula is:

$\rho$ = mean density of air above the inlet fairing $c_i$ = maximum meridional air velocity on the surface of the inlet fairing, before entering the fan entrance area $A_r$ (see FIG. 2, 14C), where there is $c_i > c_i$.

$r_i$ = inner radius of the thrust effective surface of the inlet fairing ($r_i = r_f$ = fan rotor tip radius)

$r_{a\,eff}$ ° 1.4 until 1.6·$r_i$ depending on the value of the curvature radius of the convexly curved inlet fairing r 0.2 until 0.5·$r_f$ (FIG. 2, 14C) which is defined as the still effective external radius for achieving a notable underpressure at outer radii on the surface of the inlet fairing.

in = natural logarithm $k_{F1}$ = dimensionless factor ranging between 0.6 and 0.7, because this approximation formula T1 is the simplified core part of a more complex formula derived by the inventor.

The "remaining inlet momentum force" is then defined as $T3 = T3' - T3''$, which forces will be commented upon in greater detail with respect to FIG. 2 for the case of hovering flight.

According to the frictionless potential flow theory, the "remaining inlet momentum force" $T3 = T3' - T3''$ will be compensated by the underpressure force T1 acting on the inlet fairing.

For high speed horizontal flight it is clear, that the inlet momentum force $c_0 \cdot m$ into a control surface infinitely remoted stream upwards of the jet engine, where there are parallel stream lines, can be transmitted until to another control surface drawn closely to jet engine inlet.

The following statement is valid for all forces in the inlet and for all forces acting on the external jet engine surface—except the jet exit area: $\dot{m} \cdot c_0 = \dot{m} \cdot \bar{c}_i - T1 - T3''$ For the flight velocity $c_0 = 0$ the force equilibrium in the inlet will be $$\dot{m} \cdot \bar{c}_i = T1 + T3''$$

That means, at frictionless potential flow, the braking inlet momentum force is compensated by the underpressure force T3'' acting on the fan rotor entrance area $A_r$ and by the underpressure force T1 acting on the inlet fairing and there remains $T2 = \dot{m} \cdot c_a$ actually as the only ne effective thrust generating force.

Under the unrealistic frictionless flow conditions, the geometric shape of the inlet fairing plays no role. Even at an assumed example of a jet engine, which would have a cylindrical tube with wall thickness equal to zero as an external shroud around the compressor, we would have also a considerable nose thrust acting on the sharp leading edge of the cylindrical shroud (force T1) because the underpressure in this abstract frictionless theory would approach infinity, if the inlet fairing area approaches zero.

Under real flow conditions with friction one can obtain the underpressure force T1, which is acting on the inlet fairing only by means of a carefully designed geometry of the jet engine inlet and then also only a fraction of the theoretical possible force T1 without friction. That means that the remaining effective inlet momentum force T3=T3′−T3″ is *not* compensated completely by the force T1.

In well known designs of merely cylindrically shrouded lifting engines for known VTOL-aircrafts of the fifties and the sixties, the underpressure force T1 had no serious influence on the force balance due to the very small curvature radii of the inlet fairings of these engines. In complete awareness of all these aforementioned relations, nobody should have been disappointed about the poor lifting force values of the mentioned early VTOL-aircraft designs.

Because the force T1 is practically absent when using a cylindrical shroud around the lifting fan with small curvature radii at the inlet fairing profile, the achieved thrust in hovering flight condition will not be $\dot{m} \cdot c_a$ [achieved by careless setting of flight velocity $c_0=0$ in the formula $F=\dot{m} \cdot (c_a - c_0)$]. Instead of $\dot{m} \cdot c_a$ the static thrust during hovering flight will be $F = \dot{m} \cdot c_a - \dot{m} \cdot \bar{c}_i + 0.5 \cdot \dot{m} \cdot \bar{c}_i$.

For measurements of the static thrust of jet engines on test rigs, one can observe large diameter inlet fairings, rigidly fixed to the jet engine inlet. Furthermore one can observe no underpressure measuring sensors on these big diameter inlet fairings, and there are also no standardized specifications about size and shape of this big diameter fairings (sometimes called "bellmouth") in use.

These big diameter inlet fairings on test rigs develop a considerable force T1, which compensates approximately the force T3, T3=T3′−T3″, so that this widely used method of measuring static thrust on test rigs makes unallowed use of the presence of T1, whereas the aircraft engine in starting position does not have such a big diameter inlet fairing.

Thus, considering that $\dot{m} \cdot c_a$ is the only one force contributing to the take off thrust, is a mistake, because it stems from unrealistic test conditions.

Sometimes this type of thrust is designated as "gross thrust", but where is then the clear definition of standardized inlet fairings and where are specified measurements for gaining knowledge about the force T1? One can observe nothing in literature and test reports, which goes into this direction.

Taking regard to the real flow conditions with friction, one has to apply considerable design efforts in order to create a force T1 and to make this underpressure force T1 acting on the inlet fairing as large as possible, for the purpose of saving engine power. Exactly this endeavor is the object of the invention described herein.

Deficiency Nbr. 2:

The second of six deficiencies of the state of the art literature concerning the force balance of jet engines at take off conditions and at hovering flight conditions consists in the unrealistic assumptions concealed in the formula for the ratio lifting force F divided by engine power P which is $$F/P = \eta \frac{2}{c_a}$$

This correlation is derived in the literature under the unrealistic assumption (criticized under "Deficiency 1" that the jet engine exit force $T2 = m \cdot c_a$ alone contributes to the resultant thrust during hovering flight.

The kinetic power of the exit jet $\dot{m} \cdot c_a^2/2$ is obtained by multiplying the delivered engine power with a total efficiency $\eta$. This is the simple derivation:

$$F/P = \frac{m \cdot c_a}{1/\eta \cdot m \cdot c_a^2/2} = \eta \frac{2}{c_a}$$

where $\eta$ not only comprises the fan efficiency multiplied with a flow channel efficiency but where $\eta$ also actually is made responsible for the non-presence of a frictionless flow, because only under the assumption of a frictionless flow $m \cdot c_a$ the only contribution to the static thrust during hovering flight. In this widely used formula for F/P $\eta$ is made responsible for the nonpresence of frictionless flow at infinite distance upstream of the jet engine inlet! $\eta$ in this connection is not precisely defined in the state of the art literature, it is considered as "destiny" for each jet engine type.

This superficiality in the state of the art literature is deficiency Nbr. 2.

In order to understand the invention represented herein, it is necessary to draw a control surface closely around the lifting engine, when applying the momentum law, in order to get an improved force balance. In this improved force balance we take not only regard of the force $T2 = \dot{m} \cdot c_a$ at the exit, but also to at least three forces T1, T3′ and T3″ at the inlet, which absolutely do not compensate each other, independently from the applied design geometry.

The below represented formula describes clearly the energy conversion within a narrow control surface, whereas $f_G$ takes account of the quality of different inlet fairing geometries:

$$F/P = \eta \cdot f_G \cdot \frac{1}{c_a}$$

where there is $\eta$ = efficiency of conversion of delivered engine power into kinetic energy of the jet, in essence consisting of the product of fan efficiency times flow channel efficiency (at lifting engines, for example according to FIG. 2).

$f_G$ = "geometry factor" which takes regard to the influence of geometry of the lifting engine, as the meridional profile of the inlet fairing, radial velocity distribution in the inlet and at the exit taking regard to the influences of an exit diffuser etc.

"$f_G$" also can be interpreted as the efficiency of flow energy conversion outside of the narrow to the lifting engine drawn control surface compared with a frictionless flow and is a dimensionless factor, like $\eta$.

$c_a$ = jet velocity at the engine exit.
The correlation $$F/P = \eta \cdot f_G \cdot \frac{1}{c_a}$$

provides clearly two possibilities to improve the ratio F/P: There is the property of F/P to be proportional to $1/c_a$ at the one side and the influence of the meridional geometry on the other side, expressed by $f_G$. "$f_G$" can very by more than three times, whereas $\eta$ as the product of fan-efficiency times efficiency of the meridional flowpath will vary for only some percent at different designs.

The second deficiency in the state of the art literature about force balance at hovering flight condition hence consists in the unclear definition of $\eta$ in the questionable traditional correlation $$F/P = \eta \frac{2}{c_a}$$

where $\eta$ falsely is understood only as the efficiency of the internal flow channel inside the lifting engine including the fan efficiency instead of making $\eta$ responsible for the non-presence of the abstract potential flow until infinity streamupwards in front of the inlet of the lifting engine. The latter missing interpretation would be the only possible intelligent interpretation of the formula $$F/P = \eta \frac{2}{c_a}.$$

Exactly this possibility of interpretation has been "forgotten" in the state of the art literature which circumstance leads to unjustified large expectations concerning the lifting force on the basis of the herein criticized formula.

Deficiency Nbr. 3:

The third of six deficiencies in the force balance of hovering flight of the presently established state of the art literature consists in the application of the constant "2" in the correlation $$F/P = \eta \frac{2}{c_a}$$

to all different geometries of lifting engines whereas the definition of the efficiency $\eta$ remains unclear and can even be false.

It would be more convenient to use the proposed term geometry factor "$f_G$" which, for example would assume the value of "1" for the lifting engines with cylindrical tubelike inlet ducts instead of the inappropriate value of "2", if one would apply a realistic force balance, as suggested under "Deficiency Nbr. 1".

Now one can understand the twice too large disappointing lifting force expectations in the years of the sixties for cylindrically shrouded lifting engines.

Deficiency Nbr. 4:

The fourth deficiency is a consequence of the insufficient awareness for the presence of the underpressure lifting force T1 acting on the inlet fairing and that this force—apart from losses due to curved flow—can be gained without additional engine power beside the amount of power, which is necessary to generate T2. This can be explained with the fact, that the underpressure generating centrifugal forces along the curved stream lines have no components in tangential direction except in terms of frictional forces.

Therefore T1 can be added to $T2 = \dot{m} \cdot c_a$ as a second positive lifting force. The power however is supplied only for the generation of T2. The fact, that T1 is only a "backgaining" force according to the abstract potential flow theory, which assumes frictionless conditions and according to which T1 should compensate the inlet momentum force together with the underpressure force in front of the lifting fan, should not lead to the neglection of T1.

Deficiency Nbr. 5:

The fifth deficiency stems from the nonobservation of realistic forces in the inlet region and consists in the false conclusion, that an exit-diffuser contributes to the improvement of the ratio "Lifting Force/Engine Power" = F/P when there is a merely cylindrically shrouded inlet flowpath. Indeed the total lift force then decreases more rapidly than the engine power decreases in the absence of a sufficiently large inlet fairing force T1. Such a tendency cannot be the purpose of an exit diffuser. Insufficient knowledge about these correlations led to diffuser applications at prototypes of other companies with disappointing lift performances.

Deficiency Nbr. 6:

The sixth deficiency of the state of the art literature, which made it particularly difficult to accept the design features of the invention is the unlimited application of the rule for the optimization of the energy effort for the generation of jets as derived by Froude, according to which the jet velocity plotted over the jet radius should be constant.

In this assertion, which is represented as an absolute truth in scientific papers, it has been forgotten that in the case of a lifting engine with a one stage axial compressor also the negative lift producing inlet momentum force is negatively "optimized" in this way. This happens simply because the velocity-distribution in the exit area appears again nearly unchanged in the inlet area.

A necessity of the invention is the strong increase of the meridional velocity from the center line of the fan towards outer radii, which is an intended deviation from the optimization rule according to Froude. But this intended deviation causes only approximately three percent exit thrust loss if the meridional velocity increases three times from hub to tip compared with the so called "optimum layout", whereas the reduction of the inlet momentum force and the strong stimulation of the underpressure force T1 over the inlet fairing with nearly no additional engine power brings a gain of lifting force of more than thirty percent!

The layout design of the fan of the invention happens neither according to the "free vortex blading theory" with constant meridional velocity over the radii nor according to the second well known method "degree of reaction = constant over radius" with a slight decrease of the meridional velocity from hub to tip, because the precondition for the derivation of both methods, the cylindrical shroud of the fan, is not present in the design according to the invention.

The layout design of the fan according to the invention is based on a force equilibrium along the strongly curved meridional stream lines.

BRIEF DESCRIPTION OF THE DRAWINGS

The above and other objects, features and advantages of my invention will become more readily apparent from the following description, reference being made to the accompanying highly diagrammatic drawing in which:

FIGS. 4, 4A, 5, 5A, 5B, 6, 6B show variations of the relative arrangement of rotor vane cascade and the downstream positioned guide vane cascades, rudders, fowler flaps etc. on the support struts, enlarged simplified sections along the sectionline S—S in FIG. 2;

FIGS. 7A to 7E, 8A to 8E and 9A to 9E show the radial distribution of different functions. These functions are the vertical component of the meridional velocity $c_{mv}$ the radial distribution of the energy supplied per kg air $-h_u$; the radial distribution of the blade angle $\beta$ depending on the layout of the meridional geometry represented particularly by the tangent angle $\alpha_i$, where FIG. 7A through 7E show a meridional tangent angle $\alpha_i$, of the inlet fairing in a place opposite to the fan-rotor blade tip of 40°, the FIG. 8A through 8E a corresponding angle of 60° and FIG. 9A through 9E show an angle $\alpha_i$ of 90°;

FIGS. 7G, 8G and 9G show the corresponding geometry of the rotor blades seen in the view direction H (as seen in FIGS. 10A, 10B and 10C) along their radial extension;

FIG. 7H represents the corresponding view of a rotor blade with the traditional state of the art geometry;

FIG. 15 is a partially sectioned elevational view which shows a lifting engine according to the invention installed in a nacelle of an aircraft in order to achieve VTOL-properties;

FIG. 16 is a view similar to FIG. 15 which shows a design variation with retractable trailing edge ring at the exit;

FIG. 17 is a view similar to FIG. 15 which shows a further VTOL aircraft with a multistage axial compressor and with a propelling engine (gas turbine) installed in the aircraft nacelle;

FIG. 17A is a diagram which shows the radial distribution of the rotor blade angle $\beta$ through all stages on hand of diagrams;

FIG. 17B is a diagram which shows the change of the inclination of the airfoil chord angle against the direction of rotation (called also "blade angle" in the state of the art literature) increasing from a section m—m towards a section a—a in FIGS. 15 through 18;

SPECIFIC DESCRIPTION

Figure 1:
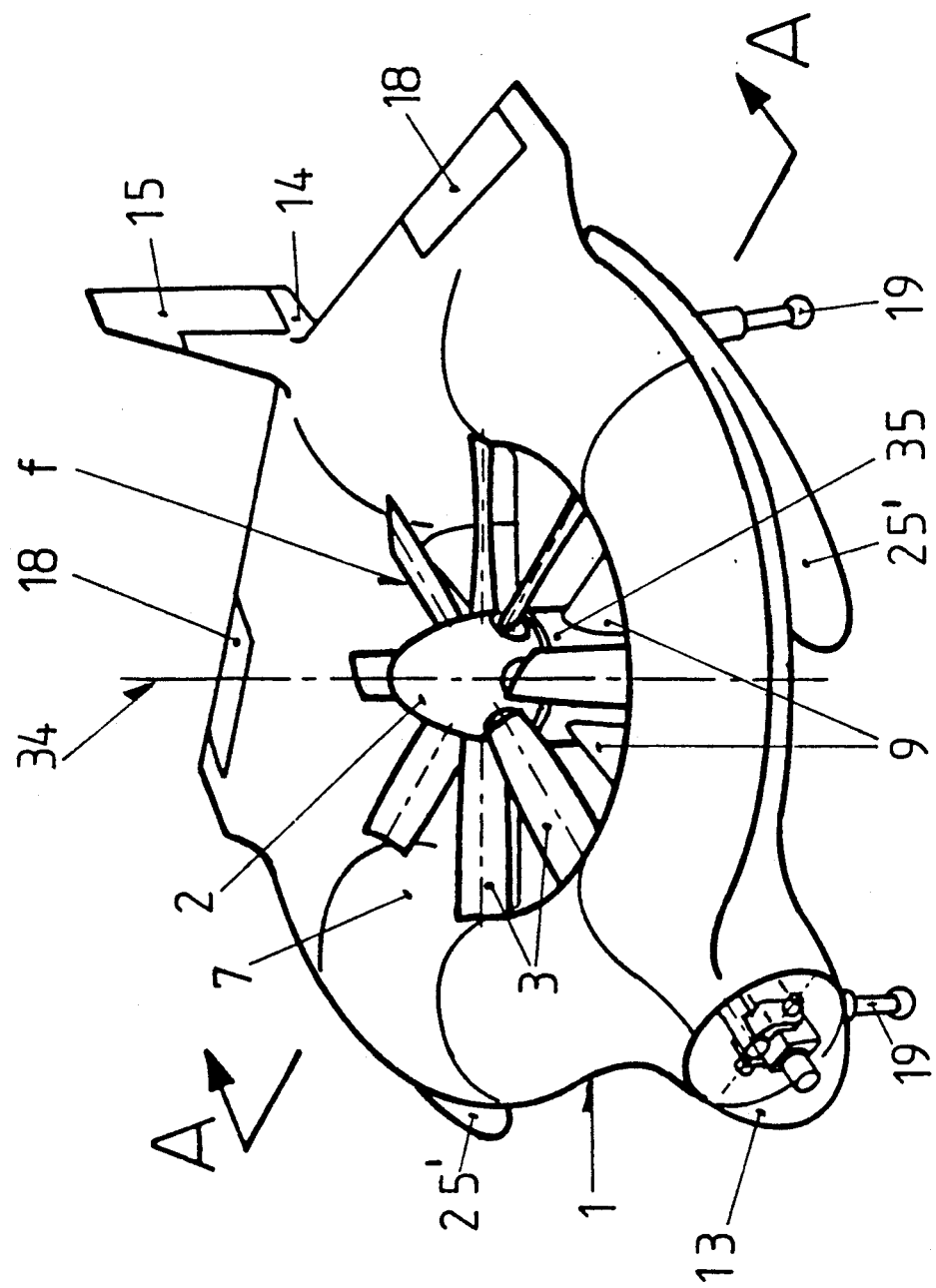
FIG. 1 is a perspective view which shows the application of the invented lifting engine as a free standing self sustaining aircraft vehicle.

An airborne lifting body according to FIG. 1 consists of a disk like support body 1 with a nose 13 at the front side and a tail 14 and a fin 15 at the rear side. On both sides of the tail there are combined elevator rudders and ailerons 18.

The support disk 1 rests on at least three landing legs (only two are visible in FIG. 1) of any known design with wheels, skis etc. The support disk 1 might have a transport room or a pilot room in front for picking up TV-cameras and freight which can be transported also in side containers 25' or even inside the support disk body 1. These arrangements are of secondary importance in relation to the core of the invention.

The purpose of FIG. 1 is to show that a disk like support body 1 forms a torus like inlet fairing in the close vicinity of a fan f, whereas deviations from the rotational symmetry on the air inlet surface, like the tail 14 with the fin 15 or elevator-aileron rudders 18 are located at a distance greater than 1.4 times of the amount of the fan tip radius away from the fan centerline. The underside of the disklike support body 1 can also have deviations from rotational symmetry, like the landing gear 19, load containers 25' but these features are arranged in a manner that they do not influence the flow out of the lifting engine exit.

The fan rotor f arranged to be concentric with the center line 34 of the aircraft body whose main bearing carrying hub 35 is supported by radial struts 9 on the support disk 1. The main bearing carrying hub 35 again supports a rotatable hub 2 which is streamlined and which has a number of fan rotor blades 3. One can see also in FIG. 1 that the fan rotor blades 3 are shrouded by a well rounded inlet fairing 7 at their tips. This fairing contour has a radial distribution of a certain curvature outgoing from a horizontal tangent to the disk body 1 towards the fan f.

Figure 2:
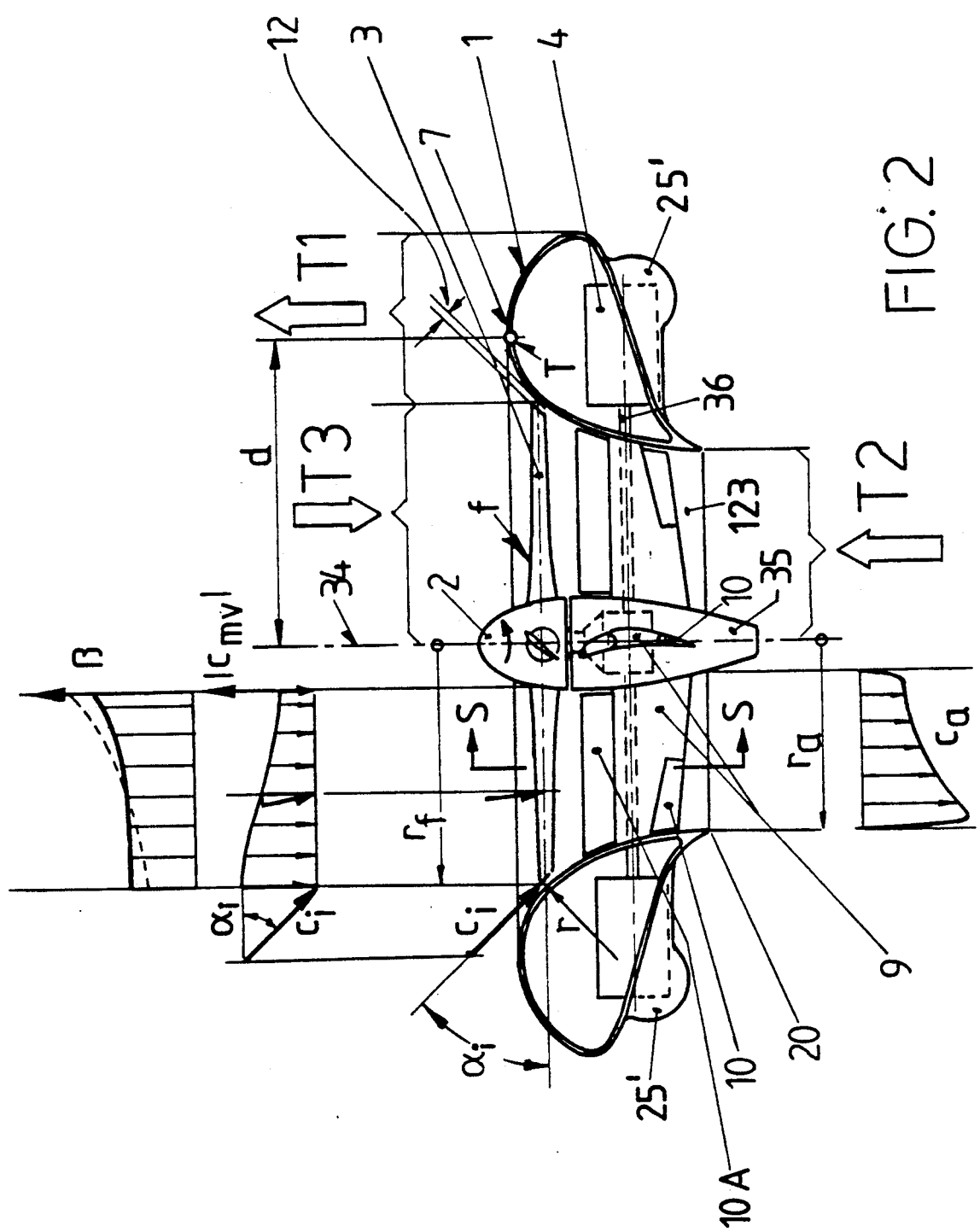
FIG. 2 is a diagrammatic section A—A of FIG. 1 showing the distribution of different typical functions over the radius of the fan.

FIG. 2 shows the geometry of the inlet fairing in relation to the arrangement of the rotor blades 3. FIG. 2 is the section A—A of FIG. 1.

FIG. 2 makes also clear, that the main bearing carrying hub 35 must not necessarily carry also the fan propelling engine. Particularly for the case of high engine power, engines 4 might be positioned oppositely in the main disk body 1 and transfer their power over shafts 36 to a gear inside the bearing carrying hub 35.

In order to be able to point out particular features of the geometry, let us explain the role of the inlet fairing 7.

One can see, that the inlet fairing 7 has an approximately torus like contour with a variable curvature radius r beginning from an approximately horizontal tangent plane at a distance d from the centerline 34 passing the tips of the rotor blades 3 and becoming more narrow downstream of the fan. The air flow, activated by the fan f passes the radial struts which might contain also the radial shafts 36 and flowing downwards, where the construction of cross sectional area will cause an increase of flow velocity. One can see, that the exit radius $r_a$ has a smaller dimension than the fan tip radius $r_f$. The exit nozzle 123 at the underside terminates with a sharp trailing edge 20 from where the external contour of the support disk body 1 with a sharp edge like angle at the beginning and with a more flat angle at greater radii returns to the maximum diameter of the support disk body 1. For simplification of the drawing, the landing gear 19 of FIG. 1 is not shown in FIG. 2.

FIG. 2 shows also the typical forces T1, T2 and T3, which have been explained in the foregoing theoretical considerations. It is obvious, that forces T1 and T2 support the lift, whereas force T3=T3'−T3'', which in words is equal to inlet momentum force T3' reduced for the amount of the underpressure force T3'' is a negative lift producing force.

In traditional designs according to the state of the art, one tried to achieve a maximum lifting force T2 of the exit momentum, by means of reducing the exit radius $r_a$ which caused an increase of engine power and a decrease of aircraft stability.

By means of the design features of the invention there should take place a reduction of the negative lift force T3 down to a minimum, whereas the lifting force T1, which acts at larger radii, should increase to a maximum. On this way the disk support body 1 is "hanging on" the underpressure generating stream lines of the force T1 to a considerable part of the resultant lift, which causes as a side effect also more positional flight stability of the aircraft body. In other words, the fractional part of the thrust force T1, acting on larger radii is enlarged in the total sum of thrust forces T1+T2−T3. For the achievement of such a design feature it is necessary to change the radial distribution of the meridional velocity over the radius $r_f$ of the fan—in contrast to traditional designs—towards an increasing meridional velocity from hub to tip instead of the traditional constant or even from hub to tip decreasing distribution of the meridional velocity through the fan. Thus, it is also obvious that the pressure difference between front and rear side of the fan f is greater at outer radii than at inner radii.

In FIG. 2 one can see the radial distribution of the vertically projected meridional velocity $c_{mv}$ with the typical radial increase of the downwardly directed velocities. The radial increase of the meridional velocity is greater towards the exit by means of suitable design of the exit nozzle 123 as one can see from the profile of the exit velocity $c_a$ over the exit radius $r_a$. Because the tangent to the inlet fairing contour 7 has an inclination with the angle $\alpha_i$ opposite to the tips of the fan rotor blades there will be $(1/\sin \alpha_i)$—times larger inclined velocities $c_i$ generated, which vertical projection $c_{mv}$ is still larger at outer radii than compared with values at inner radii. In order to achieve these conditions, the shroud 7 forms a close gap 12 against the outer diameter of the fan $2r_f$, which should be less than $1/25$ of $2r_f$.

The amount of the angle $\alpha_i$ is not only dependent on the curvature radius r of the inlet fairing 7, it depend also on the relative height position of the fan f. The amount of the curvature radius of the inlet fairing in the place opposite to fan tip radius $r_f$ will range preferably between $0.2r_f$ until $0.5r_f$ whereas the angle $\alpha_i$ will be comparatively flat in a design according to FIG. 2 due to the high location of the fan f over the most narrow diameter of outer meridional contour.

As explained in the foregoing theoretical background at the beginning of this disclosure, the negative thrust force T3 is the resultant force over the fan inlet area, which components are the force T3' (this is the braking negative lift generating force of the inlet momentum over the fan inlet area) and the force T3'' (this is the static thrust supporting underpressure force over the fan inlet area) where the amount of T3' dominates. The two forces T1 and T3' have a ratio to each other according to the formula below:

$$T1/T3' \approx 1/(\sin \alpha_i)^2$$

This correlation indicates, that an angle $\alpha_i$ as small as possible will contribute to an increase in the lifting force T1 and at the same time to a reduction of the negative lifting force T3'.

Until now, both types of forces have been neglected in the traditional force balance for lifting engines according to the state of the art.

The foregoing described geometry of the inlet fairing contour 7 alone does not generate the desired distribution of the meridional velocity $c_{mv}$.

The essential additional feature is a certain geometry of the fan rotor blades 3. These rotor blades 3 are controllable in a cyclic and/or collective modus like rotor blades of helicopters as pointed out later with reference to FIGS. 4 through 6. Beside the control of the rotor blade pitch, the twist of the rotor blades has to be taken into account, so that the airfoil chord line L (see FIG. 7E) has a predetermined angle $\beta$ against the direction of rotation (or horizontal direction). This blade angle $\beta$ is not constant over the radius. In traditional designs according to the state of the art this angle $\beta$ increases continuously from tip to the hub, as there is pointed out with a dotted line in the top diagram of FIG. 2 or one can say also, that there is a decrease of the angle $\beta$ from hub to tip. This design feature corresponds with established theories, the "free vortex blading" theory or the theory of the constant degree of reaction over the radius.

If the forces T1 and T3 should be influenced in the described favorable manner, which causes a radial increase of the pressure difference between fan front side and fan rear side and also an increase of the meridional velocity $c_{mv}$ towards outer radii then there are much more high values of the blade angle $\beta$ at outer radii as to see in full line in the top diagram of FIG. 2. It is typical for the invention, that the blade angle $\beta$ changes only small in a radial midsection of the rotor blade (the mid section is considered from the first quarter to the third quarter of the rotor blade length) as later on is pointed out in FIGS. 10A through 10C.

In the special case of the FIG. 2 the angle $\beta$ stays constant from the midsection towards the tip as to see in full line in the top diagram of FIG. 2.

In some cases the angle $\beta$ will increase from the midsection towards the tip and in some cases it will decrease expressively in the outermost radial section (FIGS. 7A through 7E, particularly 7D).

All blade twist configurations of the invention have an apparently flat midsection of the function of blade angle $\beta$ over the radius in common (see FIGS. 7D, 8D, 9D which are calculated by means of the formula described herein). This feature is in contrast to the conventional layout of the radial distribution of $\beta$, which is marked with dotted lines in the mentioned figures and which correspond to cylindrical or straight lined conical meridional shroud contours.

All these design means are directed to produce the shown functions for the meridional velocity $c_{mv}$ and the shown specific energy $h_u$, which is proportional to radial pressure difference distribution between inlet side and exit side of the lifting engine.

Figure 3:
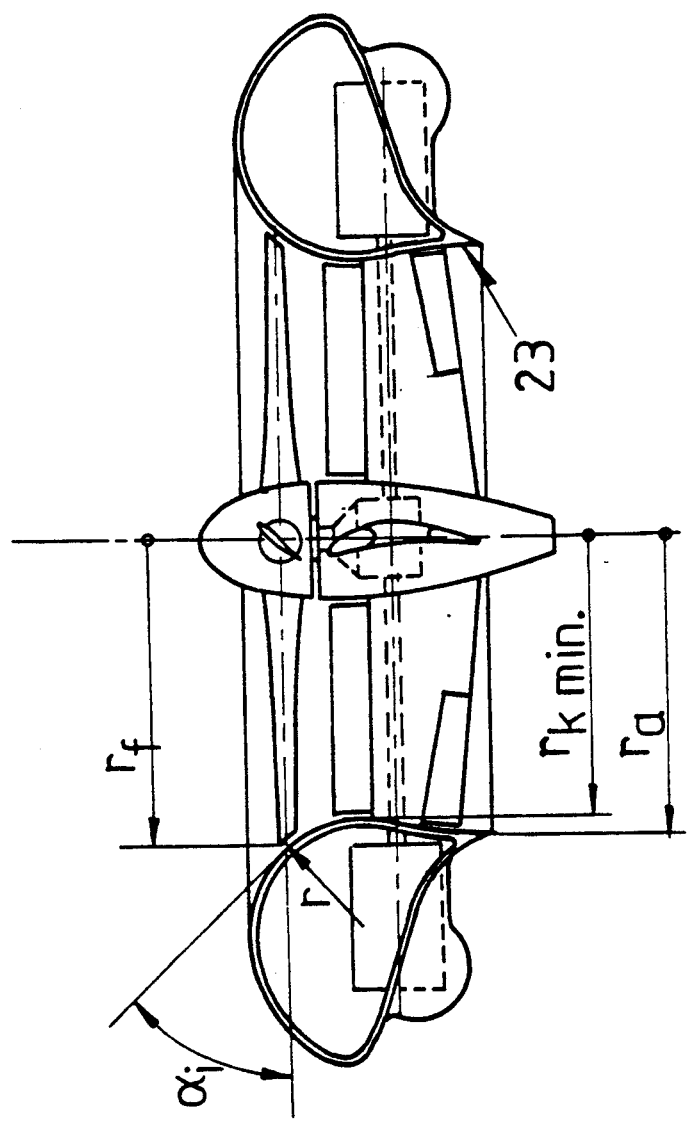
FIG. 3 is a view similar to FIG. 2 but of a device where there is an exit diffuser downstream of the fan instead of an exit nozzle as in FIG. 2.

A particular geometry can realize the requirement to generate a maximum force T1 and a minimum force T3 in the inlet region (in order to achieve maximum lift with a minimum engine power). Variations in the exit are possible as FIG. 3 shows. This design has the inlet geometry as FIG. 2 has, but instead of an exit nozzle 123 with contracting flow area there is an expanding diffuser 23. The exit flow channel contour radius $r_a$ is larger than the minimum channel contour radius $r_{k\ min}$ which causes a reduction of the exit velocity $c_a$.

On this way a part of the possibly achieved exit thrust force T2 is sacrificed (as a consequence of the large exit area) but there is also a considerable reduction of engine power to note. But this design according to FIG. 3 makes only sense, if the thrust supporting underpressure force T1 acting over the inlet fairing has a satisfying amount.

FIG. group 4 through FIG. group 6 show different designs in a cylinder section along line S—S in FIG. 2. It is suitable that the fan rotor blades 3 are adjustable in a cyclic and/or collective modus for the purpose of aircraft positional control around the longitudinal and transversal axis as known from helicopter rotors. This kind of "pitch control" is a part of the state of the art and will not be described herein in detail.

When the rotor blades 3 are adjustable around an axis P1 with a rotation 41 in all FIG. group 4 through 6, then the action of the rotor blades might be supported by controllable guide vane designs 10A, 10A' and 26, which are mounted in some cases on the struts 9.

These guide vanes compensate the angular momentum of the air flow caused by the rotor blades. The guide vanes 10A, 10A' and 26 are either supported rotatable around axis P2 linked to struts 9 or around a separate axis P4 or they have a sliding suspension (FIG. 4A). The propulsion of the guide vanes 10A, 10A' (rudder type guide vanes) and 26 might be derived from the same control machinery, which controls also the rotor blades 3, thus synchronizing automatically the motion of both types of airfoil cascades. This is a preferred design principle in contrast to FIG. 6. On this way the lift force of the aircraft can be influenced within a minimum of time.

In FIGS. 4B through 6B the arrow u indicates the direction of rotation of the rotor blades 3. The control of the rotational motion of the lifting engine around its center line (vertical axis) in hovering flight condition happens by means of rudders 10, which rotate around axis P3.

A variation according to FIG. 4A shows, that the guide vanes 10A' make a curved sliding motion 39 instead of an angular turn around an axis 42 (FIG. 4). This kind of kinematic is known as Fowler-flap for a different purpose application on wings of conventional aircrafts.

Figure 5:
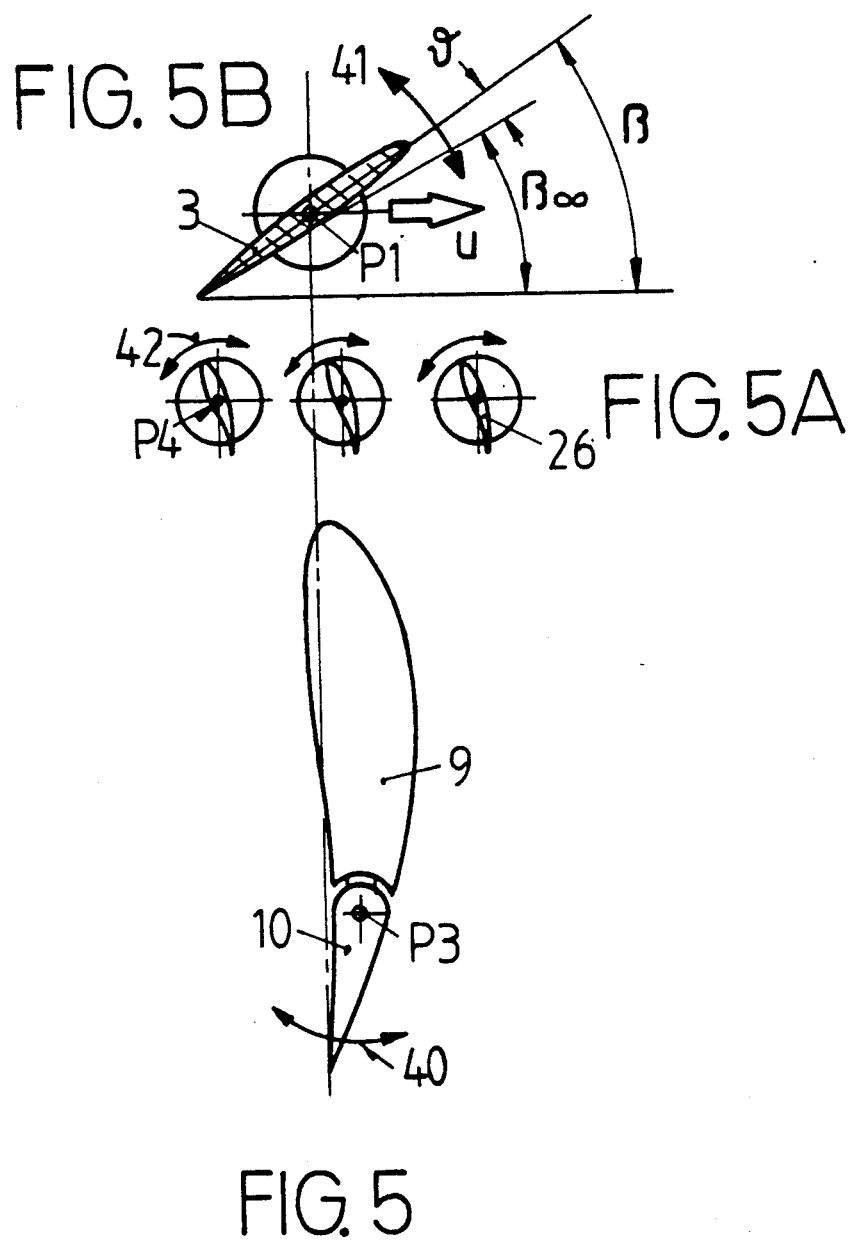

FIGS. 5-5B show an improved design compared to FIGS. 4-4B. Instead of rudder-like guide vanes 10A there is a cascade of multiple guide vanes 26, which can be turned around axis P4.

Because there will be at least two of these guide vanes 26 arranged per support strut 9 with it's inherent rudder 10, the angular momentum of the air flow caused by the rotor blades 3 will be nearly perfectly compensated and thus the support struts with their rudders 10 will be exposed to a more coaxial and parallel directed air flow. Hence the aircrafts turning stability around the vertical axis increases. It will affect particularly the hovering flight condition in a favorable manner if the guide vanes 26 perform a synchronized motion to the rotor blades 3 in the direction of arrows 42. This might happen either manually or automatically. The angular adjustment 42 of the guide vanes 26 around the axis P4 will cause a different adjustment angle compared with the corresponding angle of the rotor blades 3.

The angular motion of rotor blades 3 and guide vanes 26 will not be the same in general. There will be a gear with transmission ratio larger or smaller than "1" between rotor blades 3 and guide vanes 26 in order to coordinate their synchronized motion in the sense of the arrows 41 and 42. The transmission ratio of the gear might be variable in some cases.

In FIG. 5B there are the rotor blade airfoil determining angle $\beta$, $\beta_\infty$ and $\theta$ indicated. The blade angle $\beta$ (=profile chord angle) has been mentioned already when FIG. 2 has been discussed with regard to FIG. 7E. $\beta_\infty$ is defined in the conventional theory of axial turbo machinery as the angle of an undisturbed screw like rotating flow in an infinitely remoted distance streamup and downstream of the fan rotor, if there is no force applied to this flow. $\theta$ is the relative angle of attack (also called angle of incidence) against $\beta_\infty$ in order to apply force to the flow. The sum of both angles is the blade angle $\beta$, which is defined as the angle of the airfoil chord line against the direction of rotation. The amount of $\beta_\infty$ is determined by the radial distribution of the meridional velocity and circumferential velocity over the radius. The latter is connected to the fan speed. The amount of $\theta$ takes regard to the airfoil shape, to the number of blades and to the radial distribution of the airfoil length (=depth of the rotor blade). This incidence angle $\theta$ will have a conventional amount of 1 to 4 degrees. Usually the airfoil profile thickness of the rotor blades will decrease in radial direction from hub to tip and also $\theta$ will decrease from hub to tip at conventional designs. In contrast to that conventional conditions, air flow velocities and pressure differences are radially increasing from hub to tip at designs according to the invention represented herein. That means that the specific energy supplied to each kg of the passing airflow, expressed in Joule per Kilogramm (J/kg), designated as $h_u$ will increase towards outer radii in contrast to conventional designs. As a consequence, the rotor blades are more exposed to high loads in outer regions. Therefore it is suitable for fan layouts of the invention that the incidence angle $\theta$ is proportional to the angle $\beta_\infty$ over the radius, which can be expressed by the following approximation formula:

$$\operatorname{tg}\beta_i / \operatorname{tg}\beta_x \approx \operatorname{tg}\beta_{\infty\,i} / \beta_{\infty\,x}$$

where index "i" means values at maximum radius $r_f$ (see FIGS. 2, 3) and where index "x" means values in any distance X from the maximum radius towards inner radii. X is defined as a fraction of the rotor blade length l and where hence X has the value zero at $r_f$ and the value 1 at the hub.

Therefore statements about $\beta\infty$ concern also $\beta$ in the case of the invention? The radial distribution of the specific energy $h_u$ will be discussed later on hand of FIG. 7 through FIG. 9.

FIGS. 6 and 6B show a simple design, where the rudders 10 have to perform also the function of the rudders 10A (see FIG. group 4) and guide vanes 26, so that there might be a non linear connection between the motion of the rotor blades 3 in the sense of arrow 41 and rudder 10 in the sense of arrow 40'.

One can see in all FIGS. 4–6B that the support struts 9 and their inherent rudders will have an asymmetric airfoil profile like those of aircraft-wings.

On hand of the later on described FIGS. 7A through 10C different layouts of the geometry of the invention and their functions are represented.

FIG. 7 shows the consequences of a comparatively flat shroud-tangent-angle $\alpha_i$ located oppositely to the fan rotor blades tip (that means, the fan has a comparatively high position relatively to the inlet fairing contour). The amount of $\alpha_i$ shown in FIG. 7 is 40°. FIG. 10A is a three dimensional view of FIG. 7 pointing out particularly the rotor blade twist. FIG. 8 shows the consequences of a more steep shroud-tangent-angle $\alpha_i$ of 60°, where FIG. 10B is the three dimensional view belonging to it, pointing out the effect on the rotor blade shape. Finally shows FIG. 9 the consequences of deep positioned axial compressor (fan) so that the shroud contour angle $\alpha_i$ will have an amount of 90°.

FIG. 10C shows the corresponding three dimensional view to FIG. 9. All these design variations are shown also in FIGS. 7G, 8G, 9G as projections in view direction H, which is marked as arrow H in FIGS. 10A, 10B and 10C. FIG. 7H shows the comparison to a conventional fan rotor blade.

FIG. 7A is a section similar to FIG. 2 but where the shroud contour downstream of the fan f is different to FIG. 2. As already mentioned, there are different flow-path shapes possible, downstream of the fan f. As a consequence of restriction to essential features, only a part of the support struts 9 is to see in FIG. 7A. The length of the rotorblades 3 is designated with l, ranging from the tip radius $r_f$ to the hub 2 with the hub radius $r_f$. It is also to see, that X is the relative distance from $r_f$ to inner radial regions, so that the product X·l indicates a fraction of the overall rotor blade length l.

FIG. 7B shows similar to FIG. 2 the radial distribution of the vertical components of the meridional velocity $c_{mv}$ and also the inclined actual size $c_m$ of the meridional velocities with the maximum value $c_i$ at the blade tip, which are turned along marked circles into a vertical direction in order to gain the designated $c_m$ profile. This $c_m$ profile generates the pressure difference between fan front side and fan rear side which again is proportional to the $h_u$-function shown in FIG. 7C.

As described already, causes the radially increasing velocity distribution $c_m$ also an increase of the specific energy $h_u$ (J/kg) towards outer radii as visible in FIG. 7C. A consequence of this feature is an approximately similar distribution of the incidence angle to see in FIG. 7E over the radius as the angle $\beta\infty$ of the undisturbed relative flow. Some comments to that fact have been given already on hand of FIG. 5. Therefore the blade angel $\beta$ at any radial place will have a similar radial distribution as the angle $\beta\infty$:

$$\beta\infty_i/\beta\infty_n \approx \beta_i/\beta_n$$

where index "n" means the radial position of the hub and index "i" means the radial position of the fan tip.

FIG. 7D shows the plotting of blade angle $\beta$ over the blade length l (the angle $\beta\infty$ will have a similar distribution due to the aforementioned correlation). Similar to FIG. 2, the $\beta$-distribution of conventional fan layouts is shown with a dotted line in FIG. 7D.

The dotted line marking the conventional layout will have a twist $\Delta\beta_2$ measured over the length range ± (plus-minus) 0.25 l around a mean position at 0.5 l whereas the full line function of $\beta$ according to the invention will have a considerably reduced amount of twist $\Delta\beta_1$ and where the angles $\beta$ at radial inner positions are more small than compared to conventional layouts, however slightly larger at outer radii. Particularly a flat angle $\alpha_i$ according to FIG. 7 causes an increasing drop of the angle $\beta$ at large radii after a relatively flat portion at mean radii. As to see later on hand of FIGS. 8D and 9D, this drop of $\beta$ at outermost radii is an exceptional case.

At larger amounts of angle $\alpha_i$ the blade angle $\beta$ will stay approximately constant from a mean radial region towards outer radii (see FIG. 8D) or even increase (compare FIG. 9D).

The increase of $\beta$ is obviously not necessary at flat shroud tangent angle $\alpha_i$ in order to gain the steady increase of the meridional velocity $c_m$ according to FIG. 7B and the corresponding distribution of the specific energy $h_u$ according to FIG. 7C.

FIG. 10A shows a rotor in a three dimensional view, which would have a $\beta$-function as represented in FIG. 7D but with additional guide vanes 26 between fan f and support struts 9 (comparable with FIG. 5).

The FIG. 8 represent in analogy to FIG. 7 the conditions for the case, that the outer meridional contour tangent angle of the flowpath (shroud tangent angle) $\alpha_i$ has an amount of 60°. Compared to FIG. 7 that means a more deep position of the fan f in the inlet fairing 7.

Whereas the conventional theory for the layout of fans recommends an approximately constant radial distribution of meridional velocity and specific energy, as marked with dotted lines in FIGS. 8B and 8C (also in FIGS. 7B and 7C), there is in contrast to that conventional rule a strong increase of the meridional velocity and specific energy-proportinal to pressure differences to note towards outer radii at the layout according to the invention.

Furthermore one can see that the radial increase of the specific energy $h_u$ towards outer radii is raising to high values, if $\alpha_i$ also increases and that this correlation has an effect on the twist of the rotor blades.

This twist of the rotor blade is represented in FIG. 8D. The full line in FIG. 8D is marking the twist of the rotor blade according to the invention in order to achieve flow velocities and specific energy distribution (proportional to the distribution of pressure differences) according to FIG. 8B. The dotted line in FIG. 8D shows the conventional twist design of fan rotor blades.

Once again one can see, that the twist $\Delta\beta_1$ of the innovative design defined over a radial mean range 0.50 l±0.25 l has a considerably reduced amount than compared with a conventional twist $\Delta\beta_2$ defined over the same radial range. FIG. 8E shows a typical airfoil profile with the definition of characteristic angles. FIG. 8D shows an approximate constant angle $\beta$ from a radial mean range towards outer radii, if the angle $\alpha_i$ has an amount of around 60°. This is illustrated in a three dimensional view in FIG. 10B in analogy to FIG. 10A.

One should also compare FIG. 7G and FIG. 8G, which illustrate the view H, marked in FIG. 10A, 10B and 10C as arrow H. FIG. 7H shows a conventional rotor blade in a view H, which is represented in dotted lines in FIG. 7D and 8D. It is notable, that all designs according to the invention have much less twist in a mean radial range (FIG. 7G, 8G, 9G), than compared to conventional designs (FIG. 7H).

The third typical design variation shown in FIGS. 9A through 9G and 10C has a deeply positioned fan f inserted into the inlet fairing 7, so that the tangent angle $\alpha_i$ of the outer meridional shroud, defined in a place oppositely located to fan blade tips, has an amount of 90°. Again FIGS. 9B and 9C show the radial increase of the meridional flow velocity $c_m$ and specific energy proportional to pressure differences towards outer radii and FIG. 9D shows the corresponding distribution of the blade angle $\beta$, which is illustrated in a three dimensional view in FIG. 10C in the same manner, as the already discussed FIGS. 10A and 10B. FIG. 9G shows a view in direction H, marked as arrow H in FIG. 10C. The apparent feature which is to note in FIG. 9D is the increase of the blade angle $\beta$ from a radial mean range towards outer radii, thus causing the flow velocities and specific energy distribution (proportional to pressure distribution) shown in the FIGS. 9B and 9C.

Although only 3 different typical embodiments are shown, it has to be noted that, depending on the desired increase in the pressure differences towards the outer periphery of the fan rotor, on the selected geometry of the inlet fairing, particularly on its radius, a shape of a fan blade according to FIG. 7G, within a range of the meridional outer shroud tangent angle $\alpha_i$ of 30° to 50° results, or a configuration of the fan blades according to FIG. 8G, within a range of the tangent angle of 40° to 70°, or a configuration of the fan blades according to FIG. 9G with a meridional outer shroud tangent angle $\alpha_i$ of 65° to 90°. Of course, there are possible transitional shapes.

Any obvious common feature is that they all have a small amount of twist in a mean radial portion of the rotor blades in common, expressed by an angular difference $\Delta\beta_1$, drafted in FIG. 7D, 8D and 9D with optically notable effect represented in FIGS. 7G, 8G and 9G in contrast to much more twisted conventional rotor blades, designed according to the state of the art, expressed by the much more big angular difference $\Delta\beta_2$ on the dotted-line B-functions for comparison in FIGS. 7D, 8D and 9D. Without a look on conventional designs, just by means of considering the design variations of the invention, one can note an abnormal large ratio of a mean blade angle $\beta_m$, defined in FIGS. 7D, 8D, 9D and 14D in relation to the maximum angular difference $\Delta\beta_1$ defined over a mean radial range of the rotor blade length.

Laws of the blade twist of the invention are described by equations E1 and E2 above.

This formula describes the ratio of the tangents of the blade angle $\beta_{\infty i}$ at the outer periphery of the fan rotor in relation to blade angle $\beta_{\infty x}$ at any relative distance X from the outermost radius towards inner radii, where X is a fraction of the total blade length l when L is set l=1.

This ratio tg $\beta_{\infty i}$/tg $\beta_{\infty x}$ is marked with the formula E2 valid for inlet flowpath of rotational symmetry with curved inner wall and curved outer wall, whereas formula E1 is for an open inlet, seen from top downstream to the fan. This latter formula will be applied to lifting engines, designed without inlet shields or to designs, where inlet shields cover only a maximum of 30% of the inlet area seen from top.

Lifting engines with a curved inlet flowpath of rotational symmetry, equipped with inlet shields as represented in FIG. 13 through FIG. 18 have a twist of blade angles, which can be described by means of a slightly simplified formula apparatus compared to the general formula of equation E1, because the so designated geometry factors C and D will approach approximately the value "1" and the deflecting influence of the meridional outer shroud tangent angle $\alpha_i$ is negligible, if $\alpha_i$ has values between 77° and 90°. tg $\beta_{\infty i}$/tg $\beta_{\infty x}=[1-X(1-v)]e^B$ is the formula of claim 18.

The power B is a geometry factor to calculate according to the following correlation:

$$B = 0.5 \cdot X \cdot r_f \cdot (1 - v) \cdot \left( \frac{1}{r} + \frac{1}{r + (R - r)(X + f3 \cdot \sin X \cdot 180)} \right)$$

with
r = meridional curvature radius of the outer contour in a place located oppositely to the fan rotor blade tip
R = meridional curvature radius of the inner contour at the hub 2
f3 = 0.3 (constant)

Practical applications of this formula is shown in the tables 4 and 5. The graphical expression of the numbers of these tables is shown in the diagrams for the distribution of the angle $\beta$ in FIG. 14D and FIG. 14F shows the distribution of the meridional velocity $c_m$ as calculated in the tables.

Figure 11:
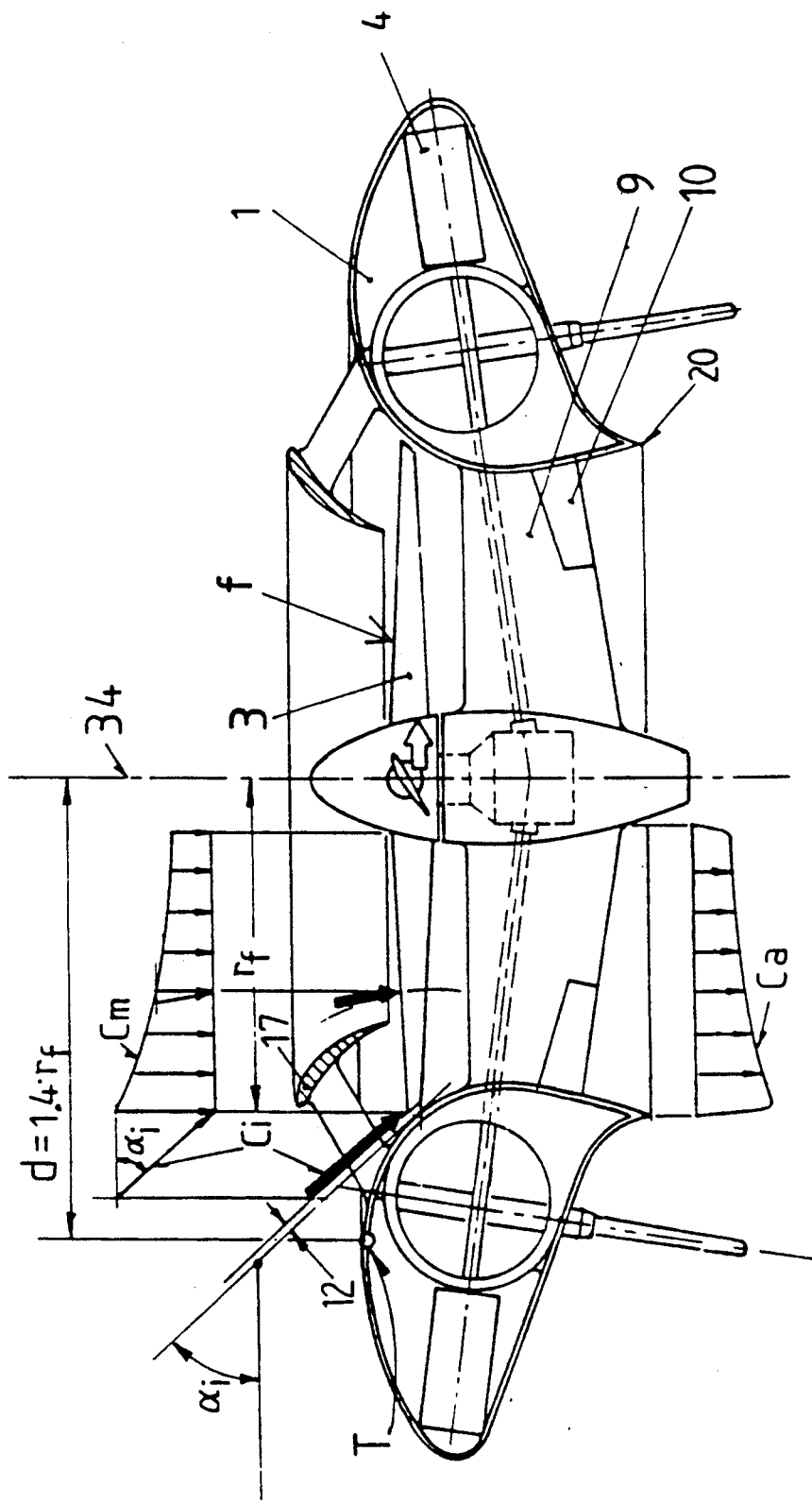
FIG. 11 is a diagrammatic section which represents a design similar to FIGS. 2 and 3 but with an additional inlet shield in the air entrance region.

FIG. 11:

The transition to designs with covered inlet area—seen from top—according to FIG. 13 through FIG. 18 is represented by the design shown in FIG. 11, which is similar to designs of FIGS. 2 and 3, but where there is a circular inlet shield 17 of rotational symmetry with a strongly curved airfoil like profile. In this FIGURE a tangent point T is marked on a radius $d = 1.4\, r_f$, where the tangent in this point must not be horizontal, but from which on at least the rotational symmetry of towards inner radii begins. This so defined point T might be positioned on a radial range between 1.2 $r_f$ until 1.5 $r_f$ but will have preferably an amount of 1.4 $r_f$.

By means of suitable geometry, inlet shield 17 should help to generate a flow velocity $c_i$ as large as possible in the radial range of the fan rotor blade tips.

There is to see also an analog distribution of the exit velocity $c_a$.

Figure 12:
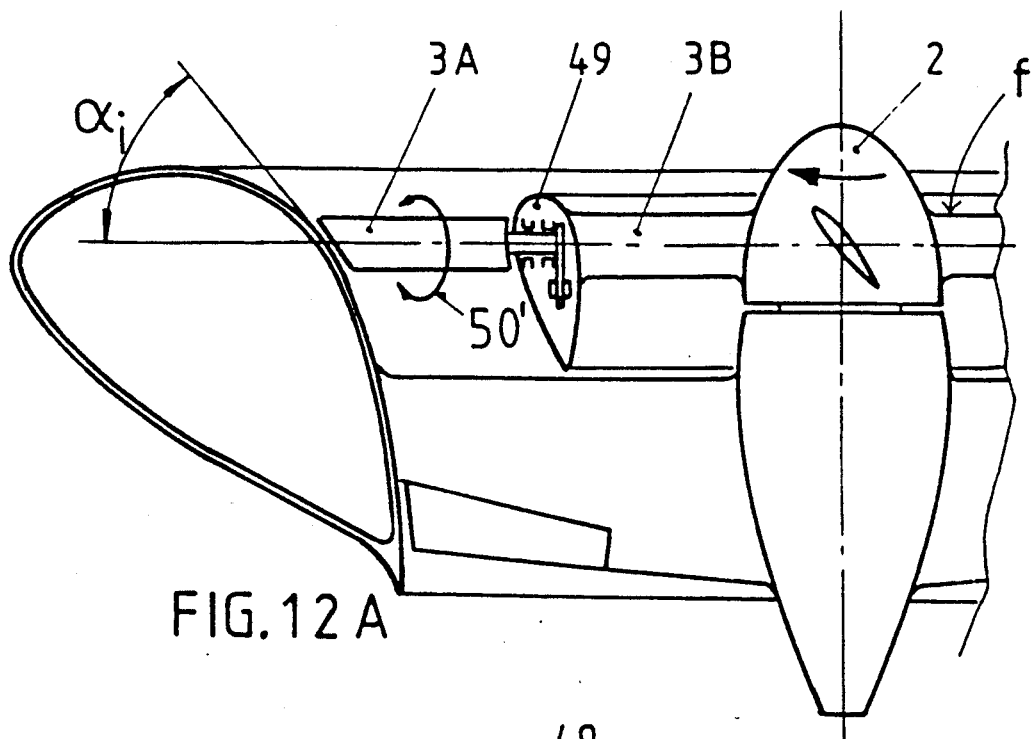
FIGS. 12A and 12B show a design variation in similar sections to FIG. 2 and 3 and a partial view from top, the variable pressure difference between inlet and exit side of the fan, which increases radially from hub to tip, being achieved by means of a radial subdivision of the fan.
Figure 12:
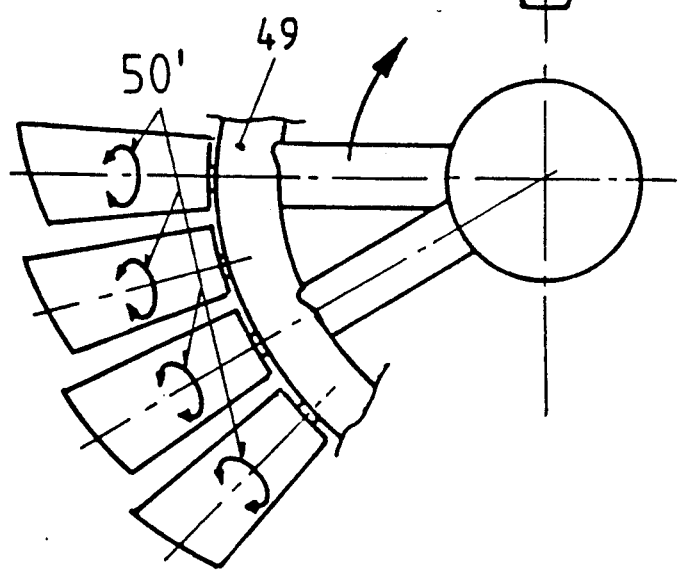

FIGS. 12A and 12B show the design possibility of a radially split fan rotor with a high number of blades in the external periphery and equipped with a pitch control by means of an adjustment motion 50'.

It is suitable to foresee a twist of the rotor blades 3A and/or rotor blades 3B as outlined already on hand of FIGS. 7 through 10. It might be suitable, to arrange the inner rotor blades 3B rigidly, concerning the pitch. They support the split ring 49. The external rotor blades 3A might be controllable around their axis in the sense of arrows 50' in a cyclic and/or collective modus as known at rotor blades on helicopters. As to see in FIG. 12A, the pitch controlling mechanism might be positioned inside the split ring 49. It is clear, that the twist of the rotor blades 3A and 3B will be an application of the invention, as outlined already on hand of FIG. 7 through FIG. 10. It does not matter, that the split ring 49 causes a slight deviation from the steadiness of the radial functions. The increment of the radial increase of the blade angle β (profile chord tangent angle β) from a mean radial range towards the tip radius might be 0° until 20° in most cases 6° until 8°. Vanes for a design like FIG. 12 will be made as hollow light weight structures under the use of fiber reinforced plastic materials. For limited design requirement FIG. 12 might represent a suitable solution.

Figure 13:
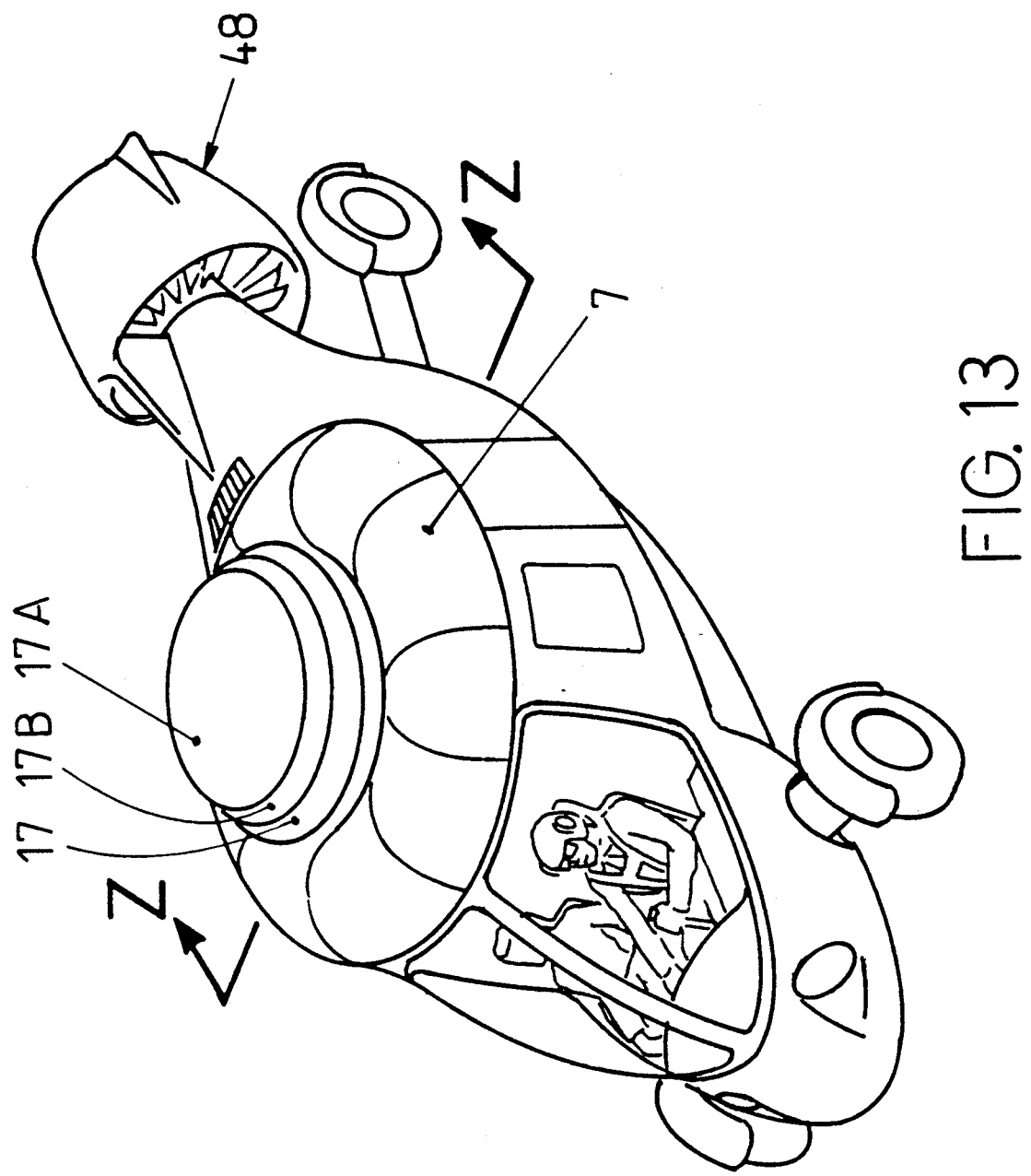
FIG. 13 is a perspective view of a vertical take off and landing (VTOL)-aircraft with a guide vane arrangement according to FIGS. 5 or 14C and which therefore is fully controllable by means of a lifting engine according to the invention.

FIG. 13:

FIG. 13 shows an aircraft which has a lifting engine downstream adjacent to the inlet fairing 7, but which is covered by several layers of inlet guide shields 17, 17A and 17B. That means more structural effort, but brings in better guidance of the incoming flow. The not visible lifting engine will have a pitch control mechanism of the vane cascades according to FIG. 5 and FIG. 14C. By means of cyclic and/or collective controllable rotor vanes and guide vanes according to FIG. 14C, the underpressure force T1 acting on the strongly curved inlet fairing and also the radial distribution of the velocity $c_a$ in the downwards directed exit area can be influenced in a manner, that strong deviations form the rotational symmetry of the flow are possible. Beside the lifting engine, the aircraft might have a second jet engine 48 for speedy horizontal motions and which fan has a more cylindrical shroud (instead of the strongly curved inlet fairing 7 of the lifting engine). The following FIGURES show details of this design.

FIG. 14A shows not only a section along plane Z—Z, marked in FIG. 13, but indicates also the essential forces T1 and T2 of the lifting engine. In comparison to FIG. 2 it is apparent, that the negative lift generating reminder of the inlet momentum force, called T3 in FIG. 2, is missing in FIG. 14A, because it is assumed, that the star like oppositely arranged inlet momentum forces are acting mainly in a horizontal plane and hence compensate each other. These conditions are achieved by means of inlet guide shields 17, 17A, 17B in conjunction with the design of rotor blades according to the invention. The conventional calculation of the lifting force balance for conventional lifting engines is neglecting the forces T1 and T3 and assumes, that T1 and T3 compensate each other but at the lifting engine according to the invention T3 and T1 are influenced in favor of T1 taking into account friction of air flow, so that the lifting engine represented herein will have more thrust, a more high efficiency and a better flight positional stability.

The underpressure force T1 is raising immediately over the strongly curved inlet fairing, which will have a curvature radius of the meridional contour, which will be 0.2 times until 0.5 times of the fan tip radius $r_f$.

The distribution of typical inlet velocities c along a line v vertical to the inlet fairing surface 7' will continue in a meridional velocity profile $c_m$ after the flow has passed the inlet guide shields 17, 17A and 17B and will finally match into a an exit velocity profile $c_a$.

The inlet guide shields 17, 17A and 17C are supported by radial struts 8. FIG. 14A and FIG. 14B show, that the flow exit area must not have circular rotational symmetry—the shape might deviate from the circular ring geometry as far as necessary.

The exit area 43 might be subdivided by intermediate walls 25. FIG. 14B as a view from top shows that walls 25 deviate from a circular shape. The channels formed this way might be supplemented with rudders 10 in order to be able to influence the positional control around a vertical axis (see also FIG. 13). Also in this design the fan rotor blades 3 are adjustable cyclic and/or collective around the axis P1 corresponding to conventional helicopter rotor blades control mechanism and there are also guide vanes 26, adjustable around axis P4, as outlined already in the description to FIG. group 5.

FIG. 14C is a large scale callout of FIG. 14A, marking features in the vicinity of the fan. It shows that a part of the radial struts 8 is formed by rotatable inlet guide vanes 8A. Furthermore one can see, that inlet shield 17A carries also an auxiliary circular guide vane 17C on top.

The difference of the inlet fairing 7' to the inlet fairing 7 of the foregoing examples consists in slot like openings 44 for sucking off air, these slots matching into a circular channel 47A below the surface of the inlet fairing 7'. Radial channels 45 connect circular channels 47A and 46, the latter being positioned slightly streamup of the fan f, on a place, where there is to expect the maximum static underpressure acting through slots on to channel 46, so that the static pressure difference between channels 47A and 46 is sucking off air through slots 44 in order to avoid flow separations. This might improve the guidance of the flow. The rotatable guide vanes 8A also serve to the improvement of flow conditions, because they ban the danger of a restriction of an angular inflow.

FIG. 14C shows also the meridional curvature radius R at the inner flowpath contour along the hub 2' as it appears in the aforementioned formula for the ratio tg $\beta_{\infty i}$/tg $\beta_{\infty X}$ (outermost blade angle $\beta_{\infty i}$ in relation to an inner blade angle tg $\beta_{\infty X}$ at a relative station X along rotor blade 3).

The other marked important geometry parameters $r_f$ and $v \cdot r_f$ are already discussed in connection to the foregoing FIGURES. It is therefore not necessary to describe them.

Figure 14:
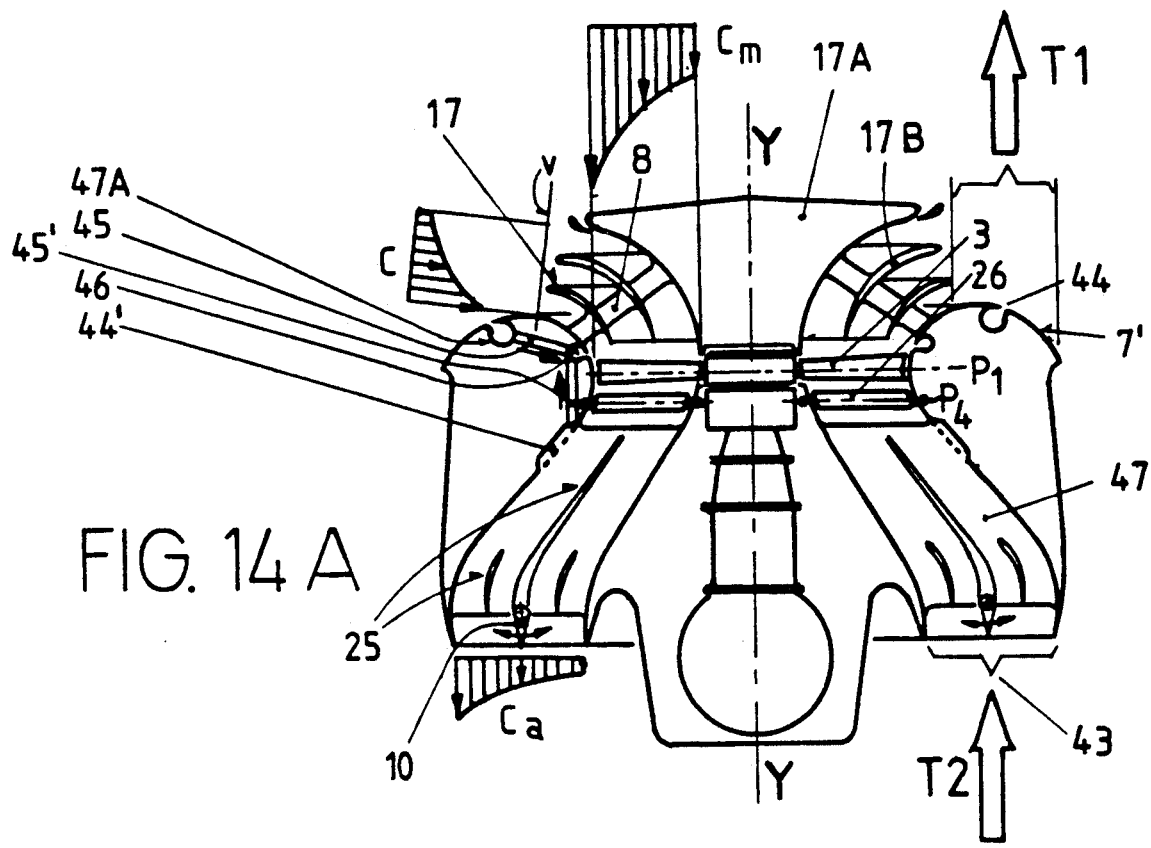
FIG. 14A shows the possible shape of a section along the plane Z—Z of FIG. 13.
FIG. 14B shows a simplified view from top corresponding to FIG. 14A, where the inlet hub and the inlet guide shields are not seen.
FIG. 14C shows an enlarged detail of FIG. 14A.
FIGS. 14D to 14F show important functions over the radius belonging to FIG. 14C and in analogy to FIG. 5.
FIG. 14G shows a cylinder section along plane S—S of FIG. 14C.
FIG. 14H is a perspective view of fan rotor blade geometry as an illustration to FIG. 14D in a similar manner as FIGS. 10A through 10C but reduced in size.
Figure 14:
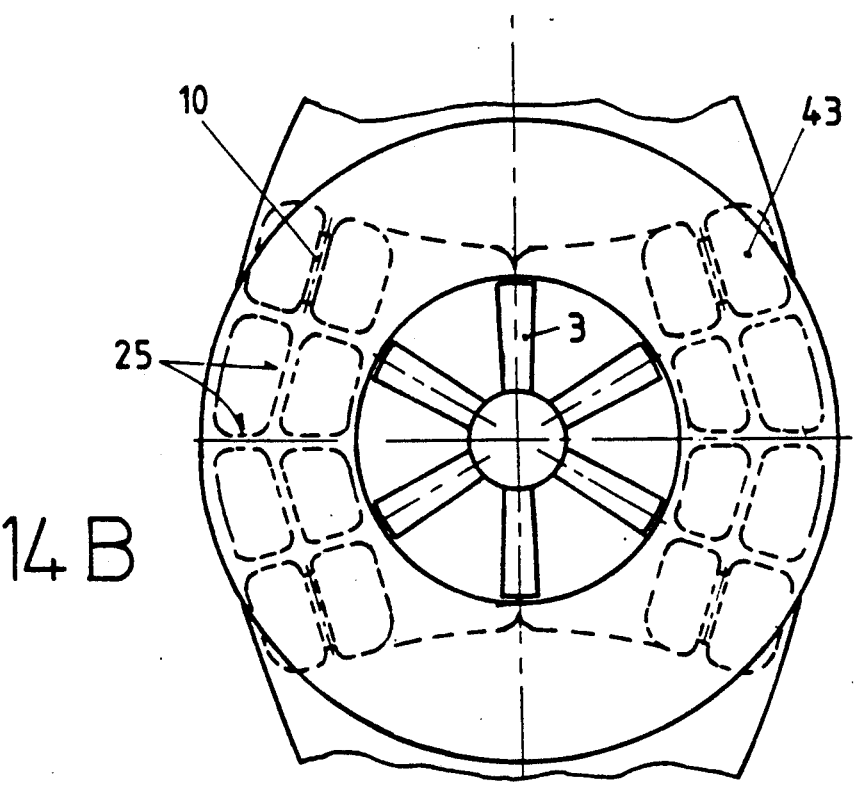
Figure 14H:
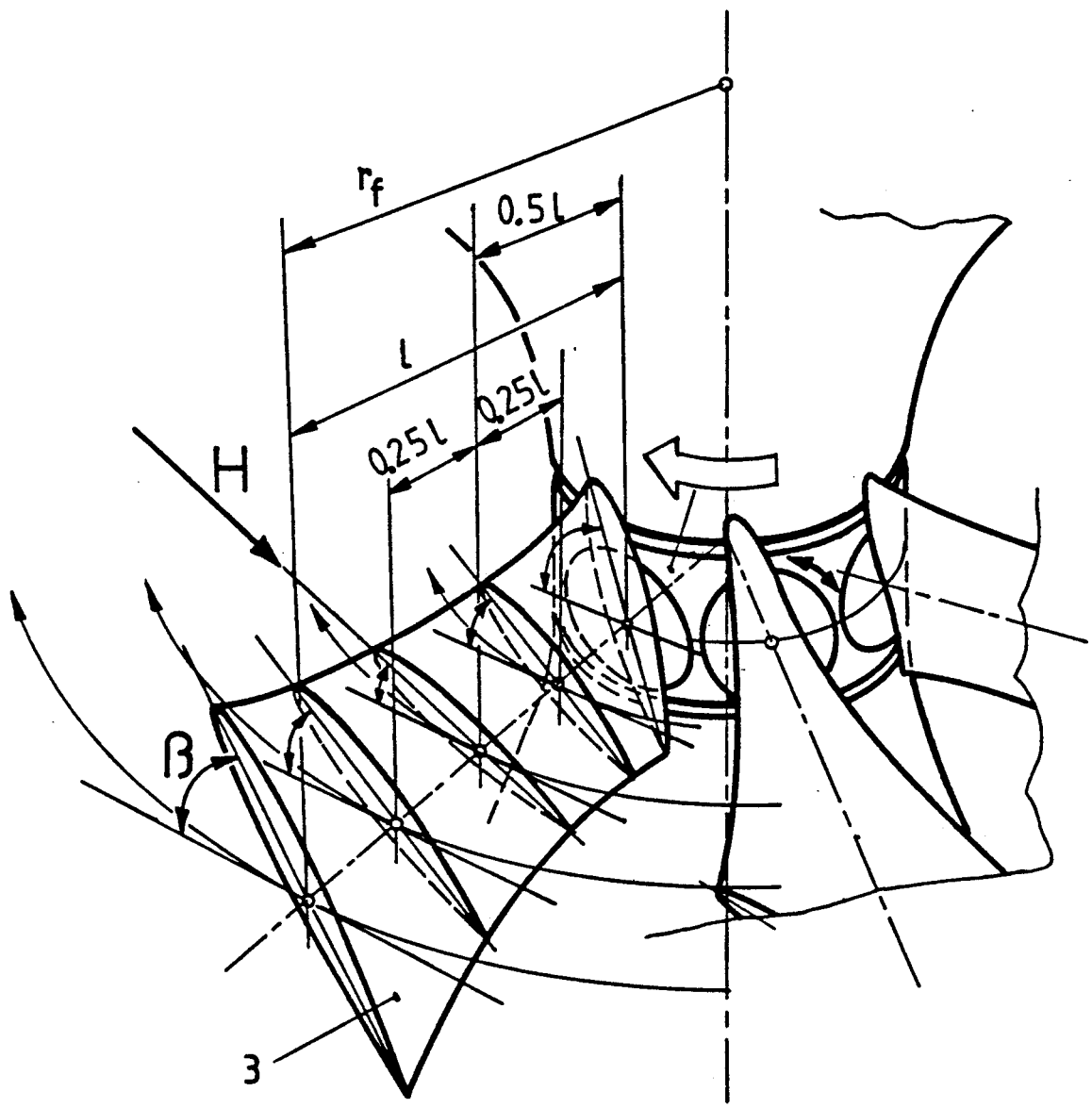

FIG. 14E and FIG. 14F show the distribution of the specific energy $h_u$ and the distribution of the meridional velocity $c_m$ over the radius of the fan f of such a lifting engine, whereas FIG. 14D shows the radial distribution of the blade angle β, which is proportional to $\beta_\infty$ (compare FIG. 14G). FIG. 14H is a three dimensional view of the rotor blade 3. FIG. 14G is a cylinder section along plane S—S in FIG. 14C and is corresponding to FIG. group 5.

The design shown in FIG. 15 is a lifting engine inserted in an aircraft nacelle, suitable for fast regulation of the thrust force during the VTOL-modus. Inlet guide shields 17A, 17B and 17C streamup of the fan are similar to those of FIG. 14, however in this design they are axially retractable by means of telescopes 28 which are moved by hydraulic, or pneumatic or mechanical elements. After the end of the VTOL-phase, thus the drag for the horizontal flight phase is reduced.

Beside the possibility to regulate the amount of lifting thrust by means of adjustable fan rotor blades 3 and adjustable guide vanes 26, as described already on hand of FIG. 5 and FIG. 14C, there is also the way to regulate the thrust force by means of variable fan speeds. But the latter way will cause a long response time in the control process. The fan speed is regulated by the speed of the propelling engine 4 which is located inside the hub body 35 in this design, However which might be located also in a side position in an analog manner to FIG. 2. There are any combinations of engine positions possible. The telescopic device 28 might be activated automatically in dependence of the engine operating modus.

Downstream of the fan f there is a flow accelerating nozzle 123. This exit nozzle might be closed with a cover 31, actuated with suitable means in direction 32 in order to reduce the drag in the horizontal flight phase.

It might be desirable to retract the sharply protruding trailing edge 20 in connection with the actuation of the cover 31 by means of moving a ring 29 into an annular space 33, which again is only possible in conjunction with an exit diffuser as shown in FIG. 16.

The arrangement of such a diffuser 23 in FIG. 16 for the purpose of fuel saving makes only sense, if there is a strong lifting force T1 acting on the surface of inlet fairing 7 at the same time, because a diffuser reduces the exit velocity $c_a$ and thus also the exit thrust force T2. An exit diffuser makes only sense, if there is an inlet and a fan according to the invention with it's inherent distribution of the velocities and pressure differences proportional to $h_u$. The exit flowpath downstream of the fan might be subdivided as already outlined in connection with FIG. 14A and FIG. 14B.

The design shown in FIG. 17 differs from the foregoing FIGURES in the feature of employing a multistage axial compressor also called multistage fan f'' with rotor blades 3 in several stages, for example in a sequence of three axial stages I–III. Such an engine might serve as an auxiliary lifting engine being in operation for the endurance of the VTOL-periode. In the foregoing single stage fan designs there is a force balance applied with the aim to increase the thrust force component T1 (this feature has been described in detail on hand of FIG. 2) achieved by a combined action of the strongly curved inlet fairing 7 and the particular twist of the rotor blades. In the design shown in FIG. 17 it is evident, that such a combined action takes place mainly in the range of the first compressor stage I.

Therefore one should not wonder, that the radial distribution of the blade angles $\beta$ against the circumferential direction of rotation will be different through all stages (I through III in the example) as shown in FIG. 17A: The first stage I in FIG. 17A will have the feature of the invention in a most expressive manner (that means, that the angle $\beta$ is increasing again from a radial mean range towards the outer radii), whereas this design feature is weakened in the diagram for the following stage II in FIG. 17A (the blade angle $\beta$ stays approximately constant from a mean radial range towards outer radii in the three stage example) and finally the rotor blades of last stage III might have a more conventional twist with a steady strongly expressed reduction of the blade angle $\beta$ from hub to tip. The latter stage will have also an approximate constant meridional velocity over the radius. This steady transition of the rotor blade twist from the design according to the invention in the first stage to the "state of the art" design in the last stage is the essential feature of the design shown in FIG. 17.

FIG. 17 shows also one of several possible means to influence the amount of the thrust force;

The exit nozzle 123' might have a variable exit area by means of adjustable flaps 50. The design of FIG. 17 might have a sequence of rotor vanes 3 with an alternating direction of rotation and without guide vanes 26 between the rotor vanes.

FIG. 17B represents the sections along planes m—m and a—a marked in FIG. 17 showing typical rotor blade airfoils. These sections in the mean radial range and at outer radii are marked also in FIG. 15, 16 and 18. There is a predetermined blade angle $\beta$ of the chord L to see in section m—m representing the conditions at mean radii and that there is an increment $\Delta\beta$ in addition to $\beta$ to note at the external section a—a at the right side of FIG. 17B. These conditions are expressed also in the top diagram of FIG. 17A for the stage I.

Figure 18:
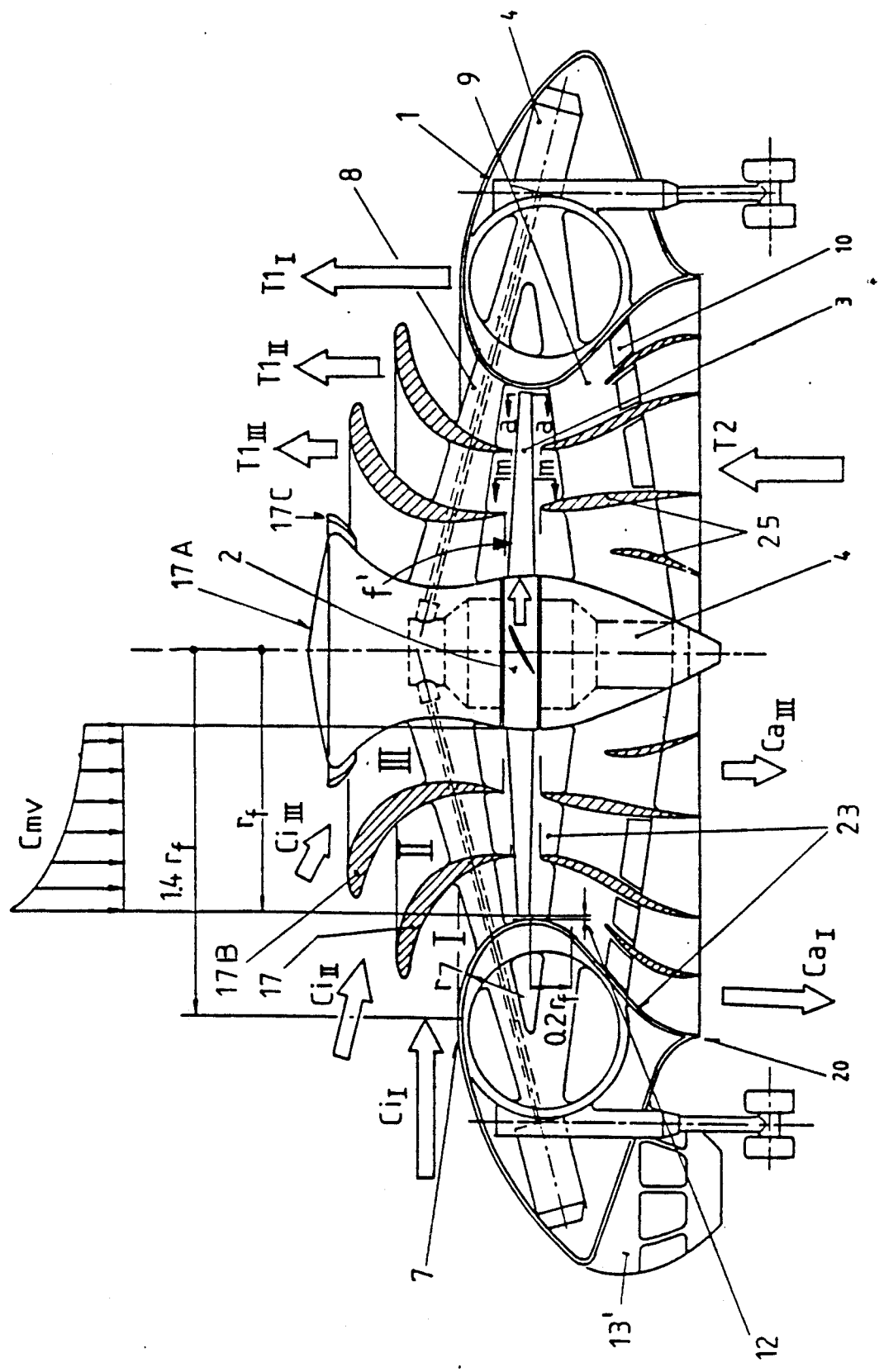
FIG. 18 is a diagrammatic section which shows a complex design for maximum saving of fuel.

FIG. 18 represents complex design for a maximum ratio "lifting force F to engine power P"—shortly designated as F/P. Propulsion engines 4 might be located also below the inlet fairing 7 beside a possible position in the central hub. At one side there might be a pilot cabin 13'. Several inlet guide shields 17, 17A until 17C generate the lifting forces $T1_I$, $T1_{II}$, $T1_{III}$ at outer radii, which increase towards outer radii as a consequence of a combined effect of the twist of the fan rotor blades 3, the shape of the inlet fairing 7 and the inlet guide shields. There is also to note a radially increasing distribution of the vertical components of the meridional velocity $c_{mv}$. A horizontal tangent plane will touch the inlet fairing 7 approximately in a radial distance 1.4 $r_f$.

Downstream of the fan f the flowpath is subdivided by walls 25, which form together the subdivided diffuser 23.

Figure 18A:
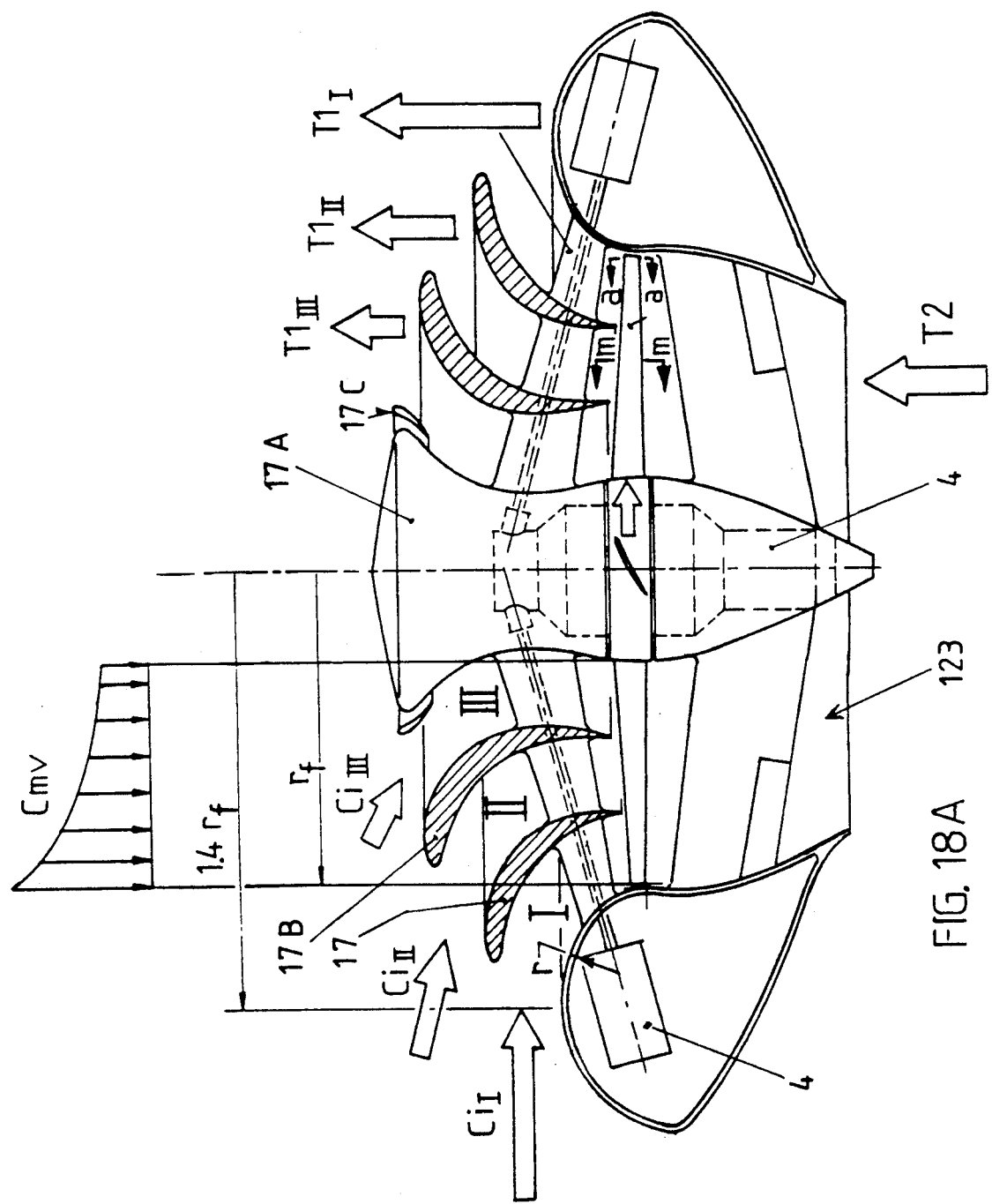
FIG. 18A is another diagrammatic section which shows a variation of the design according to FIG. 18 with an accelerating nozzle at the exit in place of the exit diffuser shown in FIG. 18.

If there is only a moderate gain of forces T1 possible, then a design according to FIG. 18A with a flow accelerating nozzle 123 will be more suitable, instead of the diffusor to see in the foregoing FIG. 18.

Saving of fuel is achieved already by the favorable force balance conditions in the inlet- that means by increasing the thrust component T1 and reducing of the inlet momentum force component by means of bending the inlet mass flow of air. Additional saving of fuel will be achieved in some cases by means of applying a diffuser 23. FIG. 18 shows that the curvature of the inlet fairing 7 will match steadily into the contour of the diffuser 23 and where the convex curvature of the inlet fairing 7 ends in an axial distance of 0.2 $r_f$ downstream of the fan f. In general this contour will end at an axial distance of 0.1·$r_f$ until 0.3·$r_f$ downstream of the fan f. This corresponds to an optimal situation. However, it is preferable when the continuous curvature of the inlet fairing ends only within a range of 0.1 up to 3.0—times of the outer radius $r_f$ of the fan rotor f, upstream of the same.

Figure 10:
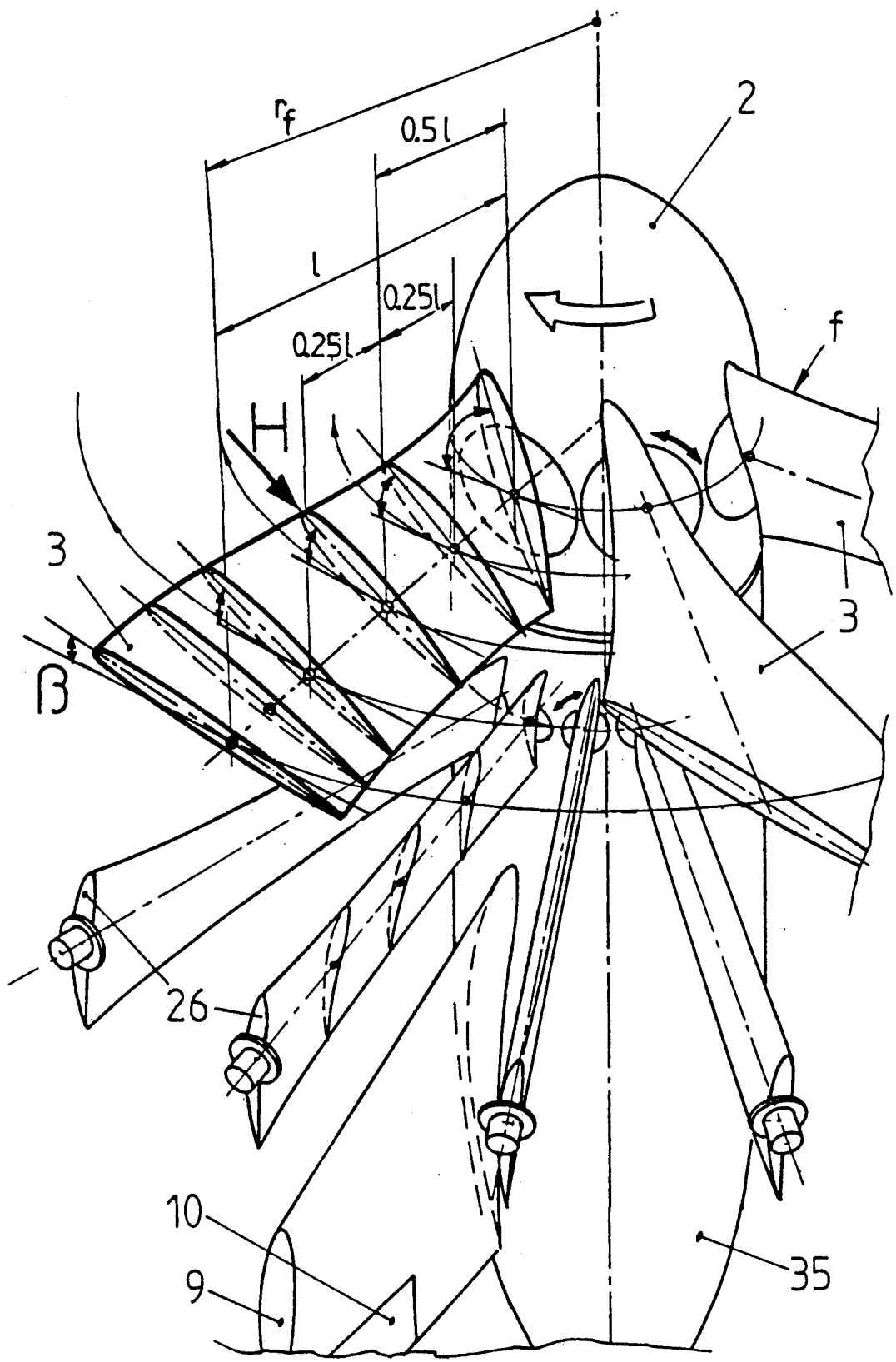
FIG. 10A is a perspective view corresponding to FIGS. 7A through 7E.
FIG. 10B is a perspective view corresponding to FIGS. 8A through 8E.
FIG. 10C is a perspective view corresponding to FIGS. 9A through 9E.
Figure 10B:
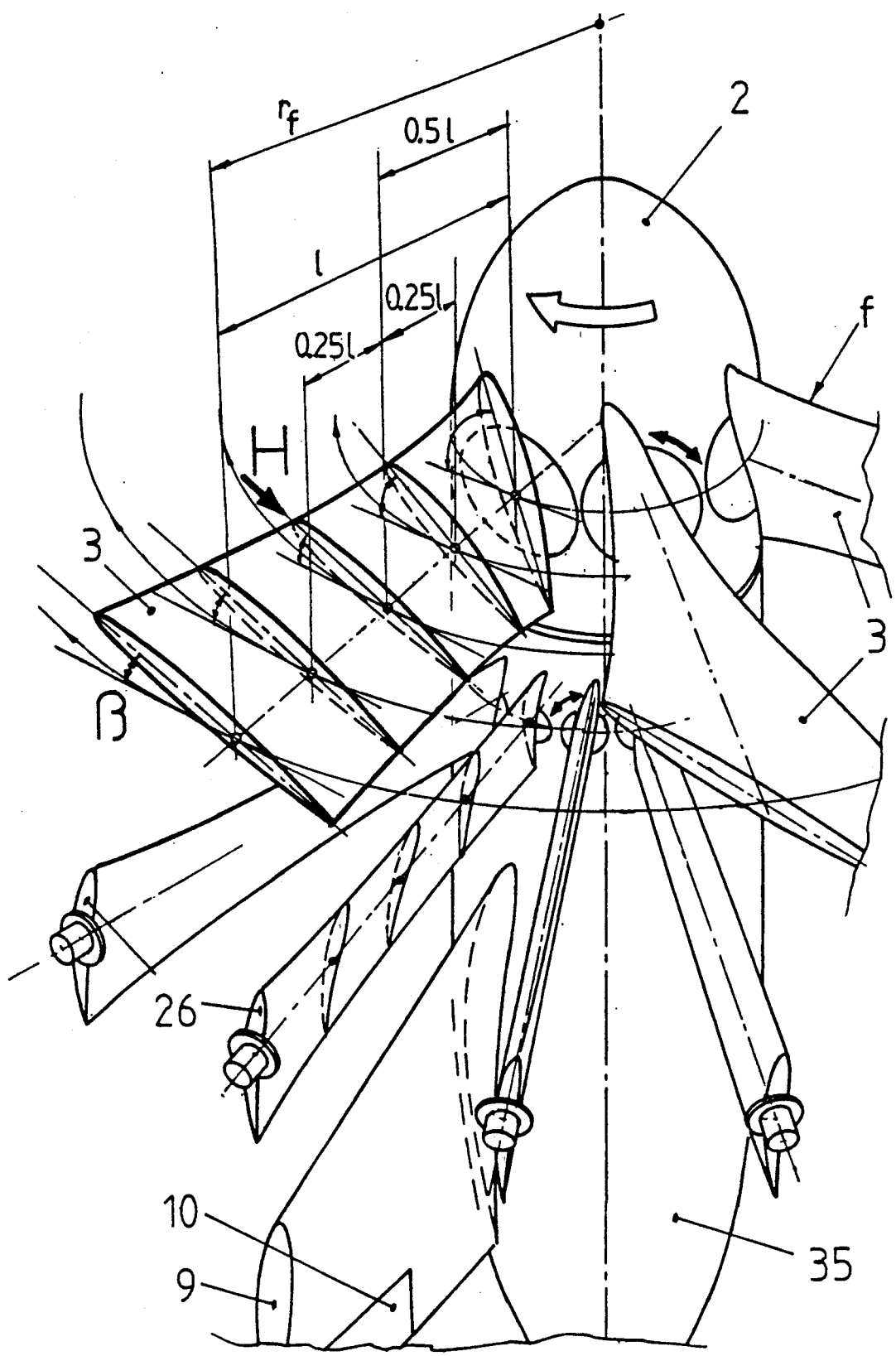
Figure 10:
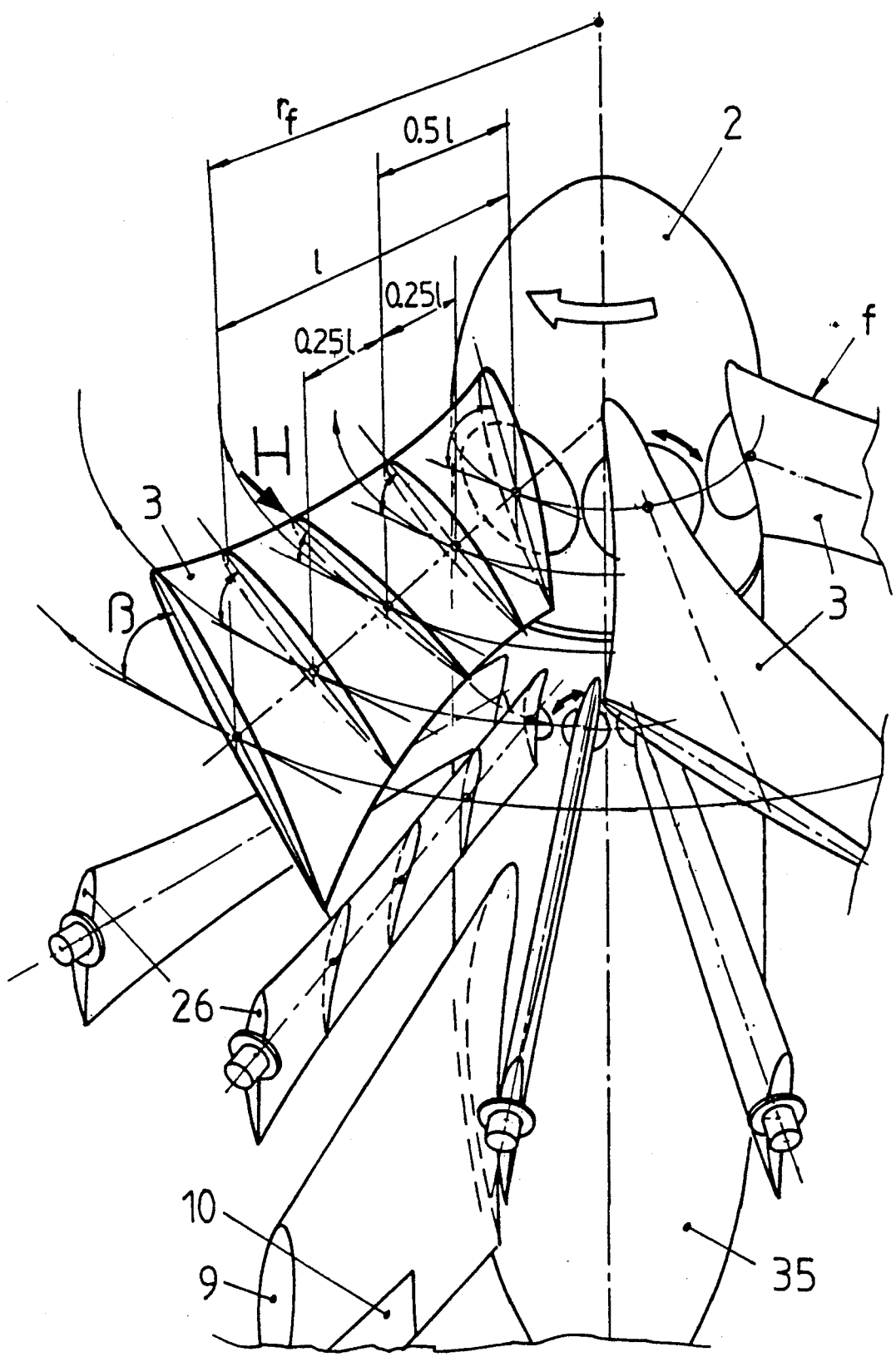

All number tables referring to FIG. 7 until FIG. 10 mirror relative ratios of general validity. That means these numbers can be adapted to any design size by means of multiplying them with suitable factors.

A multitude of design variations is possible with the invention. For example the distribution of the curvature radius r along the contour of the inlet fairing 7 might follow any law (elliptic law etc.). Statements about the size of r made in this disclosure means the amount of the curvature radius r in a place located oppositely to the fan tip radius $r_f$.

The application of the formulas represented is possible by using the MKS—(Meter/Kilogramm/Second-)—system for the dimensions.

The definitions of the angle $\beta_\infty$ is that of the conventional aerodynamic science: $\beta_\infty$ is the angle of the relative screw like inflow of air, approaching the vane cascade without disturbance, imagined as an idealized flow very far away streamup and downstream of the vane cascade.

I claim:

1. An aircraft lift generator, comprising:
   an axial fan rotatable about a fan axis and having a hub centered on said axis and a plurality of radially extending blades of airfoil cross section with blade tips remote from said axis at respective ends of said blades;
   a convexly curved inlet fairing rotationally symmetrical about said axis, shrouding said fan and surrounding same so as to define a clearance from said tips of less then 1/25 of a diameter of said fan measured diameterically to said tips; and
   means connected with said fan for rotating same about said axis to induce airflow through said fairing from an inlet side thereof to an outlet side thereof,
   said blades having twists radially outwardly from said hub such that a mean blade angle $\beta_m$ defined as an angle of inclination between the airfoil chord line of each blade and a plane of the direction of the peripheral velocity of the blade perpendicular to said axis at a radial location 0.5 l of the radial length l between said hub and said tip is in a ratio $\beta m/d\beta_1 -$ of at least 3.8 where $d\beta_1$ is a maximum difference between the blade angles at distances of 0.25 l on opposite radial sides of said location delimiting a median radial range of the respective blade.

2. The aircraft lift generator defined in claim 1 wherein said ratio $\beta_m/d\beta_1$ is substantially 8 to 12.

3. The aircraft lift generator defined in claim 2 wherein said curved inlet fairing has a tangent at a region of closest approach by said tips
   including a meridional tangent angle of 50° to 90° with said plane and said blade angle $\beta$ of each blade increases from a minimum in said median radial range to the respective tip from said median radial range by an additional increment of 0° to 20°.

4. The aircraft lift generator according to one of the claim 3, characterized by the feature, that in case of a multistage axial compressor the increment of the blade angle ($\beta$) from a mean radial range towards the fan tip radius will reduce from an initial positive value at the first stage down to the following stages and might even become a negative value with continuing stage number and where the function of the radial distribution of ($\beta$) has no turning point at the last stage and where the direction of rotation of adjacent stages might alternate.

5. The aircraft lift generator according to claim 3, wherein the part of rotational symmetry of the inlet fairing commences at a radial distance, which is equivalent to 1.2 to 1.5 times of the fan tip radius ($r_f$) of the fan (f) and the convexly curved part of the inlet fairing, which has rotational symmetry, terminates downstream of the fan (f) at an axial distance, ranging from 0.1 to 0.3 times of the fan tip radius.

6. The aircraft lift generator according to claim 3, wherein
   in an absence of inlet guide shields in the design and with the inlet side of the fan is open, the fan blade assembly is positioned so high above a minimum radius ($r_{k\ min.}$) of the inlet fairing that the tangent angle ($\alpha_i$), measured against a horizontal plane, will be 30° to 70°; and
   in the presence of a curved inlet flowpath of rotational symmetry with inlet guide shields the value of $\alpha_i$ is 55° to 90°.

7. The aircraft lift generator according to claim 3, wherein the convex curvature of the inlet fairing contour merges within an axial distance of 0.3·$r_f$, where ($r_f$ is the fan tip radius, into the contour of an exit channel which ends with a sharp trailing edge directed approximately downwardly, the exit channel being an exit diffuser equipped with a retractable trailing edge.

8. The aircraft lift generator according to claim 3, wherein the exit channel downstream of the fan (f) is subdivided into at least two channels whose cross section defined perpendicularly to the fan axis deviates from a circular shape and from circular symmetry.

9. The aircraft lift generator according to claim 3 having at least one inlet guide shield upstream of the fan, with a curved airfoil like profile, which overlaps with it's outside diameter the flowpath limiting outer wall located below said shield, and wherein at least one of the inlet guide shields is movable in the direction of the axis of the fan by means of telescopes and the fan inlet area can be covered as seen from top, when the shield is retracted.

10. The aircraft lift generator according to claim 3, wherein the fan can have rotor blades whose blade angle ($\beta$) is adjustable in a cyclic and collective manner, while downstream of this fan guide vanes are linked to be adjustable and synchronous to the foregoing rotor blades.

11. The aircraft lift generator according to claim 3, wherein at least a part of the rotor blades is subdivided by a coaxial ring and wherein at least one of the following three items apply:
    a) the number of blades within the ring is less than the number of blades outside of the ring;
    b) the rotor blades within the ring are rigid around their blade axis, whereas the rotor blades outside the ring are adjustable for the purpose of the adjustment of the blade angle; and
    c) the distribution of the blade angle ($\beta$) over the entire length of the rotor blades from hub to tip selected in a manner such, that the pressure difference between inflow front side and exit flow rear side radially increases from hub to tip.

12. The aircraft lift generator according to claim 3, wherein downstream of the fan radially extending guide vanes of such a particular design are arranged, that the angle of the airfoil chord line against the circumferential direction of rotation has an analog radial distribution as the blade angle of the rotor blades, but less expressive and where therefore the blade angle of the guide vanes, seen over a radial distance outgoing from a mean range comprising the second and third quarter of the vane length, will remain constant towards outer radii or will increase in some cases.

13. The aircraft lift generator according to claim 3, wherein the ratio of the tangents of the blade angle ($\beta$) at the fan tip radius in relation to the tangents of the blade angle ($\beta$) in a relative distance X from the outermost radius towards inner radii is described approximately by the following correlation:

$$tg\ \beta_i/tg\ \beta_x = A \cdot e^B \cdot C$$

wherein
   $\beta_i$ = angle of the airfoil chord line (blade angle) at the outermost radius (fan tip radius)
   $\beta_x$ = blade angle in a relative distance X (X is running from the value "0" to "1" of the relative blade length l=1) from the outermost radius towards the hub
A = the expression $$1 - X\left(1 - \frac{\text{rotor-hub radius}}{\text{rotor-tip radius}}\right) = 1 - X(1 - \nu)$$

and

B and C' are geometry factors in dependence of the curvature radius r of the inlet fairing oppositely to the fan tip radius and in dependence of the fan tip radius and the tangent angle $\alpha_i$ oppositely to the fan tip radius and the radius (R) of the hub contour.

14. The aircraft lift generator according to claim 13 with a free, open inlet—seen from top— characterized by a radial distribution of the proportional blade angle types ($\beta$ and $\beta_\infty$) of the rotor blades (3) of a single stage fan or of the first stage of a multi stage compressor, which is described approximately at least by the following correlation:

The tangens of the blade angle $\beta_{\infty i}$ at the outermost radius in relation to the tangens of the blade angle $\beta_{\infty x}$ in the relative distance from the outermost radius towards the inner radii will be $$tg\,\beta_{\infty i}/tg\,\beta_{\infty x} = A \cdot e^{B \cdot C \cdot D}$$

where there is $tg\,\beta_i/tg\,\beta_x \approx tg\,\beta_{\infty i}/tg\,\beta_{\infty x}$ with the auxiliary functions $$\Delta\alpha = \arctg\frac{Xr_f(1-\nu)\cos\alpha_i}{r + Xr_f(1-\nu)\sin\alpha_i}$$

$$\Delta\alpha_{max.} = \arctg\frac{r_f(1-\nu)\cos\alpha_i}{r + r_f(1-\nu)\sin\alpha_i}$$

$$\alpha_x = \alpha_i + \Delta\alpha + X(90 - \alpha_i - \Delta\alpha_{max.})$$

-continued $$r_{ix} = r_f - r(\cos(90 - \alpha_i - \Delta\alpha) - \cos(90 - \alpha_i))$$

$$r_{fx} = r_f(1 - X(1 - \nu))$$

$$m = r_{ix} - r_{fx}$$

$$q = \frac{m}{\cos(90 - \alpha_i - \Delta\alpha)}$$

$$r_x = r(1 + f1\,tg(X\,90°)) + q$$

$$q_a = \left(\frac{r+q}{\cos\Delta\alpha} - r\right)\left(1 - \left(\frac{f2}{(\alpha_i/90)^2} - f2\right)X\right)$$

$$C = \frac{q[r_f(1 - X(1-\nu)) + m/2]}{q_a(r_f - 0.5q_a\cos(90 - \alpha_i - (0.5 + X0.5)\Delta\alpha))}$$

$$B = 0.5q(1/r + 1/r_x)$$

$$A = 1 - X(1 - \nu)$$

$$D = \frac{\sin\alpha_i}{\sin\alpha_i}$$

where there is
$\alpha_i$ = angle of the tangent of the outer meridional contour at a place oppositely to the fan tip radius
r = curvature radius of the meridional contour in the same place
$r_f$ = fan tip radius
$\nu$ = "hub/tip"-ratio = $r_n/r_f$
e = base of natural logarithm.

15. The aircraft lifting generator according to claim 14, characterized by the feature, that the ratio of the relevant parameters corresponds approximately at least to values in the table below (FIG. 7B, 7D):

| | | | | | | |
|---|---|---|---|---|---|---|
| $r_f$ | 1.0000 | 1.0000 | 1.0000 | 1.0000 | 1.0000 | 1.0000 |
| r | 0.3100 | 0.3100 | 0.3100 | 0.3100 | 0.3100 | 0.3100 |
| $\nu$ | 0.2000 | 0.2000 | 0.2000 | 0.2000 | 0.2000 | 0.2000 |
| X | 0.1250 | 0.2500 | 0.3750 | 0.5000 | 0.7500 | 0.9999 |
| $\alpha_i$ | 40.0000 | 40.0000 | 40.0000 | 40.0000 | 40.0000 | 40.0000 |
| f1 | 3.0000 | 3.0000 | 3.0000 | 3.0000 | 3.0000 | 3.0000 |
| f2 | 0.0200 | 0.0200 | 0.0200 | 0.0200 | 0.0200 | 0.0200 |
| $\Delta\alpha$ | 11.5671 | 19.2567 | 24.5620 | 28.3828 | 33.4525 | 36.6307 |
| $\Delta\alpha_{max.}$ | 36.6317 | 36.6317 | 36.6317 | 36.6317 | 36.6317 | 36.6317 |
| $\Delta\alpha_x$ | 53.2381 | 62.5988 | 69.5751 | 75.0669 | 83.4787 | 89.9976 |
| $r_{ix}$ | 0.9564 | 0.9328 | 0.9193 | 0.9111 | 0.9021 | 0.8977 |
| $r_{fx}$ | 0.9000 | 0.8000 | 0.7000 | 0.6000 | 0.4000 | 0.2001 |
| m | 0.0564 | 0.1328 | 0.2193 | 0.3111 | 0.5021 | 0.6976 |
| q | 0.0720 | 0.1545 | 0.2429 | 0.3346 | 0.5238 | 0.7170 |
| $r_x$ | 0.5670 | 0.8498 | 1.1743 | 1.5746 | 3.0790 | 5,921.5908 |
| $q_a$ | 0.0791 | 0.1784 | 0.2888 | 0.4055 | 0.6473 | 0.8910 |
| C | 0.8698 | 0.8074 | 0.7746 | 0.7583 | 0.7555 | 0.7796 |
| B | 0.1797 | 0.3402 | 0.4951 | 0.6459 | 0.9299 | 1.1565 |
| A | 0.9000 | 0.8000 | 0.7000 | 0.6000 | 0.4000 | 0.2001 |
| D | 0.8024 | 0.7240 | 0.6859 | 0.6653 | 0.6470 | 0.6428 |
| $c_{mi\nu}/c_{mx\nu}$ | 0.8353 | 0.8215 | 0.8717 | 0.9623 | 1.2387 | 1.5930 |
| $tg\,Boo_i/tg\,Boo_x$ | 0.7518 | 0.6572 | 0.6102 | 0.5774 | 0.4955 | 0.3187 |

16. The aircraft lifting generator according to claim 14, characterized by the feature, that the ratio of relevant parameters corresponds approximately at least to values in the table below (FIG. 8B, 8D):

| | | | | | | |
|---|---|---|---|---|---|---|
| $r_f$ | 0.9308 | 0.9308 | 0.9308 | 0.9308 | 0.9308 | 0.9308 |
| r | 0.3100 | 0.3100 | 0.3100 | 0.3100 | 0.3100 | 0.3100 |
| $\nu$ | 0.2149 | 0.2149 | 0.2149 | 0.2149 | 0.2149 | 0.2149 |
| X | 0.1250 | 0.2500 | 0.3750 | 0.5000 | 0.7500 | 0.9999 |
| $\alpha_i$ | 60.0000 | 60.0000 | 60.0000 | 60.0000 | 60.0000 | 60.0000 |
| f1 | 3.0000 | 3.0000 | 3.0000 | 3.0000 | 3.0000 | 3.0000 |
| f2 | 0.0200 | 0.0200 | 0.0200 | 0.0200 | 0.0200 | 0.0200 |
| $\Delta\alpha$ | 6.6947 | 11.0394 | 14.0548 | 16.2588 | 19.2518 | 21.1820 |

-continued

| | | | | | | |
|---|---|---|---|---|---|---|
| $\Delta\alpha_{max.}$ | 21.1827 | 21.1827 | 21.1827 | 21.1827 | 21.1827 | 21.1827 |
| $\Delta\alpha_x$ | 67.7969 | 73.2437 | 77.3613 | 80.6674 | 85.8648 | 89.9985 |
| $r_{ix}$ | 0.9146 | 0.9061 | 0.9012 | 0.8981 | 0.8947 | 0.8929 |
| $r_{fx}$ | 0.8395 | 0.7481 | 0.6568 | 0.5654 | 0.3827 | 0.2001 |
| m | 0.0751 | 0.1580 | 0.2444 | 0.3327 | 0.5120 | 0.6928 |
| q | 0.0818 | 0.1670 | 0.2542 | 0.3425 | 0.5211 | 0.7011 |
| $r_x$ | 0.5768 | 0.8623 | 1.1856 | 1.5825 | 3.0763 | 5,921.5750 |
| $q_a$ | 0.0842 | 0.1749 | 0.2691 | 0.3651 | 0.5597 | 0.7550 |
| C | 0.9538 | 0.9288 | 0.9146 | 0.9096 | 0.9034 | 0.9099 |
| B | 0.2028 | 0.3663 | 0.5172 | 0.6607 | 0.9252 | 1.1309 |
| A | 0.9019 | 0.8037 | 0.7056 | 0.6075 | 0.4112 | 0.2150 |
| D | 0.9354 | 0.9044 | 0.8875 | 0.8776 | 0.8683 | 0.8660 |
| $c_{miv}/c_{mxv}$ | 1.0927 | 1.2116 | 1.3616 | 1.5411 | 1.9787 | 2.4415 |
| tg $Boo_i$/tg $Boo_x$ | 0.9855 | 0.9738 | 0.9607 | 0.9361 | 0.8136 | 0.5249 |

17. The aircraft lifting generator according to claim 14, characterized by the feature, that the ratio of relevant parameters corresponds approximately at least to values in the table below (FIG. 9B, 9D):

$$B = 0.5\, Xr_f(1 - v)\left(\frac{1}{r} - \frac{1}{r + (R - r)(X + f\sin X180)}\right)$$

TABLE 3

| | | | | | | |
|---|---|---|---|---|---|---|
| rf | 0.8893 | 0.8893 | 0.8893 | 0.8893 | 0.8893 | 0.8893 |
| r | 0.3100 | 0.3100 | 0.3100 | 0.3100 | 0.3100 | 0.3100 |
| v | 0.2249 | 0.2249 | 0.2249 | 0.2249 | 0.2249 | 0.2249 |
| X | 0.1250 | 0.2500 | 0.3750 | 0.5000 | 0.7500 | 0.9999 |
| $\alpha_i$ | 89.9990 | 89.9990 | 89.9990 | 89.9990 | 89.9990 | 89.9990 |
| f1 | 3.0000 | 3.0000 | 3.0000 | 3.0000 | 3.0000 | 3.0000 |
| f2 | 0.0200 | 0.0200 | 0.0200 | 0.0200 | 0.0200 | 0.0200 |
| $\Delta\alpha$ | 0.0002 | 0.0004 | 0.0005 | 0.0005 | 0.0006 | 0.0007 |
| $\Delta\alpha_{max.}$ | 0.0007 | 0.0007 | 0.0007 | 0.0007 | 0.0007 | 0.0007 |
| $\Delta\alpha_x$ | 89.9993 | 89.9994 | 89.0006 | 89.9997 | 89.9999 | 90.0000 |
| $r_{ix}$ | 0.8893 | 0.8893 | 0.8893 | 0.8893 | 0.8893 | 0.8893 |
| $r_{fx}$ | 0.8031 | 0.7170 | 0.6300 | 0.5447 | 0.3723 | 0.2001 |
| m | 0.0862 | 0.1723 | 0.2585 | 0.3446 | 0.5170 | 0.6892 |
| q | 0.0862 | 0.1723 | 0.2585 | 0.3446 | 0.5170 | 0.6892 |
| $r_x$ | 0.5812 | 0.8675 | 1.1899 | 1.5846 | 3.0722 | 5,921.5631 |
| $q_a$ | 0.0862 | 0.1723 | 0.2585 | 0.3446 | 0.5170 | 0.6892 |
| C | 1.0000 | 1.0000 | 1.0000 | 1.0000 | 1.0000 | 1.0000 |
| B | 0.2131 | 0.3773 | 0.5255 | 0.6646 | 0.9180 | 1.1117 |
| A | 0.9031 | 0.8062 | 0.7093 | 0.6125 | 0.4187 | 0.2250 |
| D | 1.0000 | 1.0000 | 1.0000 | 1.0000 | 1.0000 | 1.0000 |
| $c_{miv}/c_{mxv}$ | 1.2375 | 1.4583 | 1.6914 | 1.9438 | 2.5042 | 3.0396 |
| tg $Boo_i$/tg $Boo_x$ | 1.1176 | 1.1757 | 1.1997 | 1.1905 | 1.0484 | 0.6838 |

18. The aircraft lifting generator according to claim 13, with a curved inlet flowpath of rotational symmetry characterized by the feature, that the radial distribution of the blade angle ($\beta$) is described approximately at least by the following correlation:

The tangens of the radially outermost relative flow angle ($\beta_{\infty i}$) of the rotor blades - in the case of a multi stage compressor those of the first stage -in relation to the corresponding angle ($\beta_{\infty x}$) in the relative distance X downwards to inner radii will be $$tg\, \beta_{\infty i}/tg\, \beta_{\infty x} = (1 - X(1-v))\cdot e^B$$

where tg $\beta_i$/tg $\beta_x \approx$ tg $\beta_{\infty i}$/tg $\beta_{\infty x}$ and $r_f$ = fan tip radius
r = curvature radius of the meridional contour oppositely to the fan blade tip
R = curvature radius of the meridional contour at the hub at the intersection with the fan blade axis
v = "hub/tip"-ratio = $r_n/r_f$
f3 = 0.2, a rigid constant
and where the angle ($o_i$) of the outer meridional contour will preferably have an amount of 77° to 90°.

19. The aircraft lifting generator according to claim 18 characterized by the feature, that the ratio of relevant parameters corresponds at least approximately to the values in the table below (FIG. 14D, 14F):

| | | | | | | | |
|---|---|---|---|---|---|---|---|
| rf | 1.0000 | 1.0000 | 1.0000 | 1.0000 | 1.0000 | 1.0000 | 1.0000 |
| r | 0.4100 | 0.4100 | 0.4100 | 0.4100 | 0.4100 | 0.4100 | 0.4100 |
| R | 0.8600 | 0.8600 | 0.8600 | 0.8600 | 0.8600 | 0.8600 | 0.8600 |
| X | 0.0000 | 0.1250 | 0.2500 | 0.3750 | 0.5000 | 0.7500 | 1.0000 |
| v | 0.3000 | 0.3000 | 0.3000 | 0.3000 | 0.3000 | 0.3000 | 0.3000 |
| f3 | 0.2000 | 0.2000 | 0.2000 | 0.2000 | 0.2000 | 0.2000 | 0.2000 |
| A | 1.0000 | 0.9125 | 0.8250 | 0.7375 | 0.6500 | 0.4750 | 0.3000 |
| $r_x$ | 0.4100 | 0.5007 | 0.5861 | 0.6619 | 0.7250 | 0.8111 | 0.8600 |
| B | 0.0000 | 0.1941 | 0.3627 | 0.5184 | 0.6682 | 0.9639 | 1.2606 |
| $c_{miv}/c_{mx}$ | 1.0000 | 1.2142 | 1.4372 | 1.6794 | 1.9507 | 2.6218 | 3.5277 |
| tg $Boo_i$/tg $Boo_x$ | 1.0000 | 1.1080 | 1.1857 | 1.2385 | 1.2680 | 1.2454 | 1.0583 |

20. The aircraft lifting generator according to claim 18 characterized by the feature, that the ratio of relevant parameters corresponds at least approximately to the values in the table below:

| | | | | | | | |
|---|---|---|---|---|---|---|---|
| rf | 1.0000 | 1.0000 | 1.0000 | 1.0000 | 1.0000 | 1.0000 | 1.0000 |
| r | 0.3100 | 0.3100 | 0.3100 | 0.3100 | 0.3100 | 0.3100 | 0.3100 |
| R | 0.8600 | 0.8600 | 0.8600 | 0.8600 | 0.8600 | 0.8600 | 0.8600 |
| X | 0.0000 | 0.1250 | 0.2500 | 0.3750 | 0.5000 | 0.7500 | 1.0000 |
| $\nu$ | 0.3000 | 0.3000 | 0.3000 | 0.3000 | 0.3000 | 0.3000 | 0.3000 |
| f3 | 0.2000 | 0.2000 | 0.2000 | 0.2000 | 0.2000 | 0.2000 | 0.2000 |
| A | 1.0000 | 0.9125 | 0.8250 | 0.7375 | 0.6500 | 0.4750 | 0.3000 |
| $r_x$ | 0.3100 | 0.4208 | 0.5253 | 0.6179 | 0.6950 | 0.8003 | 0.8600 |
| B | 0.0000 | 0.2451 | 0.4488 | 0.6358 | 0.8163 | 1.1748 | 1.5360 |
| $c_{mi}/c_{mx}$ | 1.0000 | 1.2777 | 1.5665 | 1.8885 | 2.2621 | 3.2374 | 4.6460 |
| tg $Boo_i$/tg $Boo_x$ | 1.0000 | 1.1659 | 1.2924 | 1.3928 | 1.4704 | 1.5378 | 1.3938 |

* * * * *

UNITED STATES PATENT AND TRADEMARK OFFICE
CERTIFICATE OF CORRECTION

PATENT NO. : 5,035,377                    Page 1 of 3

DATED : 30 July 1991

INVENTOR(S) : Benno E. BUCHELT

It is certified that error appears in the above-identified patent and that said Letters Patent is hereby corrected as shown below:

Col. 6, Tables 1 and 2         )
Col. 7, Tables 3, 4 and 5      )  first item in last line of
Col. 32, Table                 )  each table should read:
Col. 33, both Tables           )
Col. 34, Table; and            )  -- $tg\,\beta_{\infty i} / tg\,\beta_{\infty x}$ --
Col. 36, Table                 )

Col. 7, line 22 (formula) should read:

$$\beta = 0.5 \times r_f (1-\nu)\left(\frac{1}{r} + \frac{1}{(R-r)(X-f3\sin(X \cdot 180))}\right)$$

Col. 8, line 49 should read:

... plane <u>or</u> control surface --

Col. 10, line 15 should read:

-- -- $r_{a\ eff.} \approx 1.4$ until $1.6\ r_i$ ... -- line 17 should read: -- ing $r \approx 0.2$ until ... -- line 22 should read: Ln = natural logarithm line 54, first word should be -- one -- .

UNITED STATES PATENT AND TRADEMARK OFFICE
CERTIFICATE OF CORRECTION

PATENT NO. : 5,035,377
DATED : 30 July 1991
INVENTOR(S) : Benno E. Buchelt

It is certified that error appears in the above-identified patent and that said Letters Patent is hereby corrected as shown below:

Col. 11, line 28, last word should be "these".

line 66 should end with "Deficiency 1"$\underline{)}$.

Col. 12, line 65, first word should be -- v$\underline{a}$ry -- .

Col. 20, lines 23, 32, 40, 43, 46 and 57:

"$\theta$" should read -- $\vartheta$ -- .

Col. 21, line 2 should read ...invention$\underline{!}$ ...

line 43 should end with .. hub radius $\vartheta r_f$.

last line should read:

-- $\beta_\infty / \beta_{\infty n} \approx \beta_i / \beta_n$ --

UNITED STATES PATENT AND TRADEMARK OFFICE
CERTIFICATE OF CORRECTION

PATENT NO. : 5,035,377
DATED : 30 July 1991
INVENTOR(S) : Benno E. Buchelt

It is certified that error appears in the above-identified patent and that said Letters Patent is hereby corrected as shown below:

Col. 23, line 48 should read: ... dotted-line $\underline{\beta}$ -functions..
line 57, last word should be -- below -- .

Col. 24, lines 17 - 20: This formula should be on one line.

Col. 29, line 24 (both instances) and line 31: within each formula, "d" should read $--\Delta--$ .

Col. 32, line 22 (formula) should read: $D = \dfrac{\sin \alpha_i}{\sin \alpha_x}$ Col. 33, line 53, formula should read:

$$tg\, B_{\infty i} / tg\, B_{\infty x} = (1 - x(1-y)) e^{\beta}$$

Signed and Sealed this

Twenty-sixth Day of July, 1994

Attest:

BRUCE LEHMAN

*Attesting Officer*     *Commissioner of Patents and Trademarks*